(12) United States Patent  
Li et al.

(10) Patent No.: US 11,135,514 B2  
(45) Date of Patent: Oct. 5, 2021

(54) DATA PROCESSING METHOD AND APPARATUS, AND STORAGE MEDIUM FOR CONCURRENTLY EXECUTING EVENT CHARACTERS ON A GAME CLIENT

(71) Applicant: TENCENT TECHNOLOGY (SHENZHEN) COMPANY LIMITED, Shenzhen (CN)

(72) Inventors: Yingjie Li, Shenzhen (CN); Le Wan, Shenzhen (CN); Dafu Deng, Shenzhen (CN); Jun Yin, Shenzhen (CN); Xu Cheng, Shenzhen (CN); Jiachun Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 57 days.

(21) Appl. No.: 16/221,842

(22) Filed: Dec. 17, 2018

(65) Prior Publication Data

US 2019/0118085 A1    Apr. 25, 2019

Related U.S. Application Data

(63) Continuation of application No. PCT/CN2017/102702, filed on Sep. 21, 2017.

(30) Foreign Application Priority Data

Sep. 21, 2016 (CN) .......................... 201610838804.8

(51) Int. Cl.
*A63F 9/24* (2006.01)
*A63F 13/57* (2014.01)
(Continued)

(52) U.S. Cl.
CPC .............. *A63F 13/57* (2014.09); *A63F 13/35* (2014.09); *A63F 13/44* (2014.09); *G06F 9/542* (2013.01); *G06F 9/545* (2013.01)

(58) Field of Classification Search
CPC .......... A63F 13/35; A63F 13/56; A63F 13/57; A63F 13/58; A63F 13/67; A63F 13/822;
(Continued)

(56) References Cited

U.S. PATENT DOCUMENTS

2001/0039203 A1* 11/2001 Brown .................... A63F 13/12
                                                                  463/16
2002/0099518 A1    7/2002 Tovinkere et al.
(Continued)

FOREIGN PATENT DOCUMENTS

CN          101540057 A        9/2009
CN          102136025 A        7/2011
(Continued)

OTHER PUBLICATIONS

Ben Size, "The Total Beginner's Guide to Game AI", Aug. 13, 2018, <https://www.gamedev.net/tutorials/programming/artificial-intelligence/the-total-beginners-guide-to-game-ai-r4942/> (Year: 2018).*
(Continued)

*Primary Examiner* — Justin L Myhr
(74) *Attorney, Agent, or Firm* — Anova Law Group, PLLC

(57) ABSTRACT

A data processing method includes obtaining sample data of event execution of a game client, and performing preprocessing on the sample data to obtain a plurality of layers of data combinations. Each layer of the plurality of layers of data combinations corresponds to a target event object in a same target event, different layers correspond to different target event objects in the target event, and the target event objects are event objects on the game client to be executed concurrently. The method also includes performing processing on each layer of data combinations according to a preset processing algorithm, to obtain a processing result of each layer of data combinations, and performing consolidation processing on the processing result to obtain a target instruction. The target instruction is used for instructing the game client to concurrently execute the different target event
(Continued)

objects corresponding to the different layers of data combinations.

16 Claims, 16 Drawing Sheets

(51) Int. Cl.
*G06F 9/54* (2006.01)
*A63F 13/44* (2014.01)
*A63F 13/35* (2014.01)

(58) Field of Classification Search
CPC .............. A63F 2300/60; A63F 2300/65; A63F 2300/807; A63F 13/44; A63F 13/42; A63F 13/45; G06F 17/18; G06F 9/542; G06F 9/545
See application file for complete search history.

(56) References Cited

U.S. PATENT DOCUMENTS

| | | | | |
|---|---|---|---|---|
| 2004/0143852 A1* | 7/2004 | Meyers | ............... | A63F 13/12 725/133 |
| 2005/0071306 A1* | 3/2005 | Kruszewski | ............ | G06T 13/40 706/47 |
| 2005/0107145 A1* | 5/2005 | Karashima | ............... | A63F 13/10 463/8 |
| 2006/0248451 A1 | 11/2006 | Szyperski et al. | | |
| 2010/0138843 A1 | 6/2010 | Freericks et al. | | |
| 2010/0184515 A1* | 7/2010 | Takahashi | ............... | A63F 13/12 463/42 |
| 2010/0279762 A1* | 11/2010 | Sohn | ....................... | A63F 13/67 463/23 |
| 2010/0317432 A1* | 12/2010 | Tanabe | ................... | A63F 13/26 463/30 |
| 2014/0267230 A1* | 9/2014 | Osuna | .................... | A63F 13/55 345/419 |
| 2015/0174490 A1* | 6/2015 | Fukuda | .................. | A63F 13/52 463/31 |

FOREIGN PATENT DOCUMENTS

| | | |
|---|---|---|
| CN | 104081378 A | 10/2014 |
| CN | 106445701 A | 2/2017 |

OTHER PUBLICATIONS

The World Intellectual Property Organization (WIPO) International Search Report For PCT/CN2017/102702 dated Nov. 22, 2017 6 Pages (including translation).

The State Intellectual Property Office of the People's Republic of China (SIPO) Office Action 1 for 201610838804.8 dated Aug. 11, 2017 8 Pages (including translation).

The European Patent Office (EPO) The Extended European Search Report for 17852398.1 dated Jul. 11, 2019 10 Pages.

* cited by examiner

DATA PROCESSING METHOD AND APPARATUS, AND STORAGE MEDIUM FOR CONCURRENTLY EXECUTING EVENT CHARACTERS ON A GAME CLIENT

RELATED APPLICATIONS

This application is a continuation application of PCT Patent Application No. PCT/CN2017/102702, filed on Sep. 21, 2017, which claims priority to Chinese Patent Application No. 2016108388048, entitled "DATA PROCESSING METHOD AND APPARATUS" filed with the Chinese Patent Office on Sep. 21, 2016, which is incorporated by reference in its entirety.

FIELD OF TECHNOLOGY

The present disclosure relates to the field of data processing and, specifically, to a data processing method and apparatus, and a storage medium.

BACKGROUND

Currently, the data processing rule of a turn-based event is relatively simple. Objects for executing the event have global information about the event, take actions in turns, and have a relatively long decision time for the event. The behavior of the event is conducted right away, or is determined by a feedback. For example, the turn-based event is a turn-based game. The rule of the game is relatively simple, game players have global information, take actions in turns, and have a relatively long decision time. The behavior may be conducted right away, or may be determined according to a feedback. For example, the game is the game of Go.

The data processing rule of a real-time event is complex. Objects for executing the real-time event only have part of information about the event, take actions concurrently, and have a relatively short decision time. Conduction of a behavior of the event requires time and there is a success probability. Therefore, there are differences between data processing of a real-time event and data processing of a turn-based event.

Among turn-based events, AlphaGo, an intelligent program of the game of Go is an algorithm that implements a high-level move of the game of Go by training a policy network and a value network by using deep learning and consolidating the policy network and the value network by using a Monte Carlo tree. FIG. 1 is a schematic structural diagram of a policy network and a value network of an AlphaGo algorithm according to the related art. As shown in FIG. 1, the AlphaGo algorithm trains the policy network and the value network by using deep learning. A human expert side (human expert position) transmits a policy network (SL network) of the human expert side to an artificial intelligence (AI) side (self-play position) by using a classification rollout policy and a policy algorithm (policy gradient). The AI side trains a policy network (RL network) and a value network of the AI side, to obtain data. The policy network of the human expert side and the policy network of the AI side are collectively referred to as a policy network, and the policy network and the value network are trained according to an algorithm formula and are implemented by using a Monte Carlo tree search (MCTS) algorithm.

FIG. 2 is a schematic diagram of an MCTS algorithm according to the related art. As shown in FIG. 2, a move probability is selected and a quantity of move samples is extended by using a policy network. A benefit of a current move is evaluated and a result of the benefit of the current move is fed back by using a value network. The move probability selected by the policy network and the profit of the current move evaluated by the value network are consolidated and simulated and an optimal move position is finally selected according to the current game state by using the MCTS algorithm.

However, data processing of a real-time event is far more complex than the data processing of the above turn-based event. Because there are a relatively large number of differences between data processing of a turn-based event and data processing of a real-time event, the way of combining two layers of networks in an algorithm cannot satisfy the requirement of a macro decision of a real-time event, let alone the requirement of a micro operation and, therefore, cannot satisfy the requirement of a real-time event intelligent system, causing a low data processing efficiency.

The disclosed methods and systems are directed to solve one or more problems set forth above and other problems.

SUMMARY

The embodiments of the present invention provide a data processing method and apparatus, and a storage medium, so as to at least resolve the technical problem of a low data processing efficiency.

According to one aspect of the embodiments of the present invention, a data processing method is provided. The data processing method includes: obtaining sample data of event execution of a game client, and performing preprocessing on the sample data to obtain a plurality of layers of data combinations. Each layer of the plurality of layers of data combinations corresponds to a target event object in a same target event, different layers of the plurality of layers of data combinations correspond to different target event objects in the target event, and the target event objects are event objects on the game client to be executed concurrently. The method also includes performing processing on each layer of data combinations according to a preset processing algorithm, to obtain a processing result of each layer of data combinations; and performing consolidation processing on the processing result of each layer of data combinations to obtain a target instruction. The target instruction is used for instructing the game client to concurrently execute the different target event objects corresponding to the different layers of data combinations.

According to another aspect of the embodiments of the present invention, a data processing system is provided. The data processing system includes a memory storing computer program instructions; and one or more processors coupled to the memory. When executing the computer program instructions, the one or more processors are configured to perform: obtaining sample data of event execution of a game client; and performing preprocessing on the sample data to obtain a plurality of layers of data combinations. Each layer of the plurality of layers of data combinations corresponds to a target event object in a same target event, different layers of the plurality of layers of data combinations correspond to different target event objects in the target event, and the target event objects are event objects on the game client to be executed concurrently. The one or more processors are also configured to perform: performing processing on each layer of data combinations according to a preset processing algorithm, to obtain a processing result of each layer of data combinations; and performing consolidation processing on the processing result of each layer of data combinations to obtain a target instruction. The target instruction is used for instructing the game client to concurrently execute the different target event objects corresponding to the different layers of data combinations.

According to another aspect of the embodiments of the present invention, a non-transitory computer-readable storage medium is further provided. The non-transitory computer-readable storage medium stores computer program instructions executable by at least one processor to perform: obtaining sample data of event execution of a game client; and performing preprocessing on the sample data to obtain a plurality of layers of data combinations. Each layer of the plurality of layers of data combinations corresponds to a target event object in a same target event, different layers of the plurality of layers of data combinations correspond to different target event objects in the target event, and the target event objects are event objects on the game client to be executed concurrently. The non-transitory computer-readable storage medium further stores computer program instructions executable by at least one processor to perform: performing processing on each layer of data combinations according to a preset processing algorithm, to obtain a processing result of each layer of data combinations; and performing consolidation processing on the processing result of each layer of data combinations to obtain a target instruction. The target instruction is used for instructing the game client to concurrently execute the different target event objects corresponding to the different layers of data combinations.

Other aspects of the present disclosure can be understood by those skilled in the art in light of the description, the claims, and the drawings of the present disclosure.

BRIEF DESCRIPTION OF THE DRAWINGS

The accompanying drawings described herein are used to provide further understanding of the present disclosure, and form part of this application. Exemplary embodiments of the present invention and descriptions thereof are used to explain the present disclosure, and do not constitute any inappropriate limitation to the present disclosure. In the figures.

DETAILED DESCRIPTION

To help persons skilled in the art understand better the solutions in the present disclosure, the following describes the technical solutions in the embodiments of the present disclosure with reference to the accompanying drawings in the embodiments of the present disclosure. Apparently, the described embodiments are merely some but not all of the embodiments of the present disclosure. Other embodiments obtained by persons of ordinary skill in the art based on the disclosed embodiments of the present disclosure without creative efforts shall fall within the protection scope of the present disclosure.

It should be noted that, in the specification, claims, and accompanying drawings of the present disclosure, the terms "first", "second", and the like are intended to distinguish between similar objects instead of a specific order or sequence. It should be understood that the data termed in such a way are interchangeable in proper circumstances so that the embodiments of the present disclosure described herein can be implemented in orders other than the order illustrated or described herein. Moreover, the terms "include", "contain" and any other variants mean to cover the non-exclusive inclusion. For example, a process, method, system, product, or device that includes a list of steps or units is not necessarily limited to those steps or units expressly listed, but may include other steps or units not expressly listed or inherent to such a process, method, product, or device.

Figure 1:
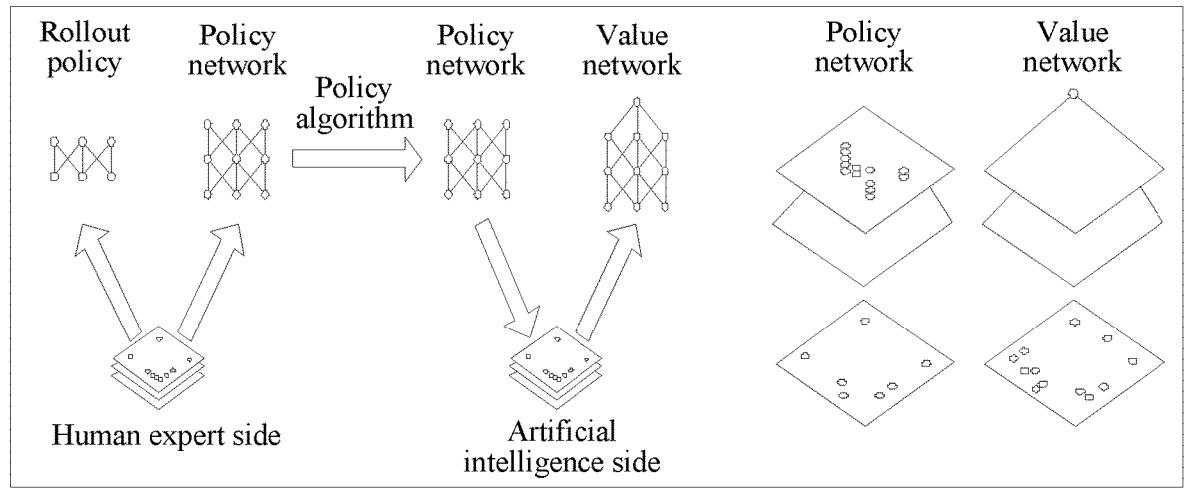
FIG. 1 is a schematic structural diagram of a policy network and a value network of an AlphaGo algorithm.
Figure 2:
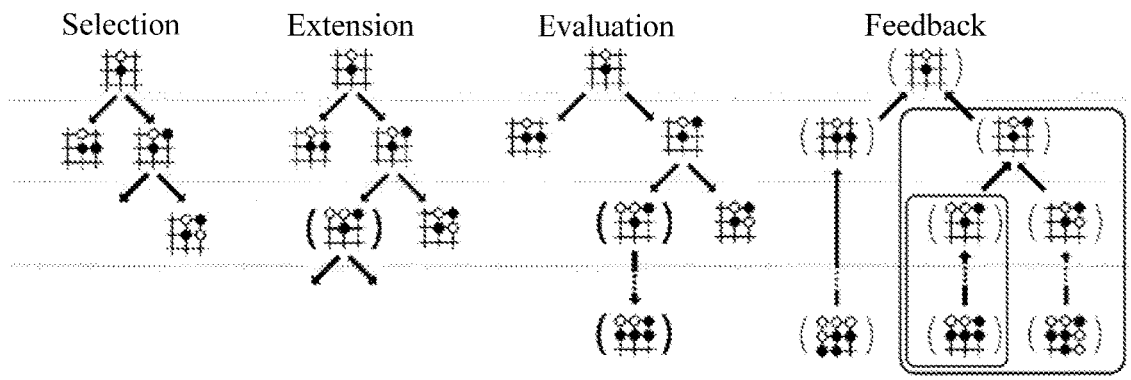
FIG. 2 is a schematic diagram of an MCTS algorithm.
Figure 3:
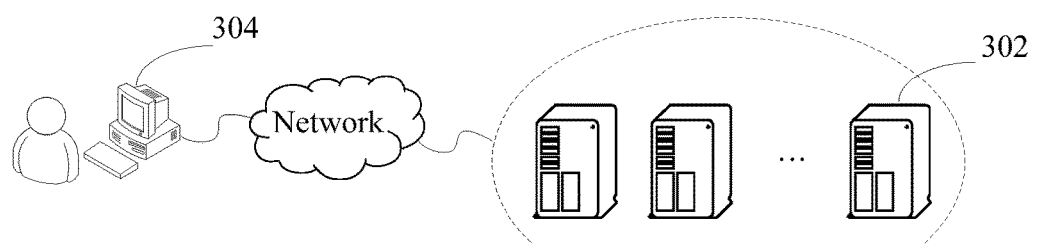
FIG. 3 is a schematic diagram of a hardware environment of a data processing method according to an embodiment of the present disclosure.

According to an embodiment of the present disclosure, a data processing method is provided. The data processing method may be applied to a hardware environment. FIG. 3 is a schematic diagram of a hardware environment of a data processing method according to an embodiment of the present disclosure.

As shown in FIG. 3, the hardware environment includes a server 302 and a terminal 304. The server 302 is connected to the terminal 304 by using a network. The network includes a wide area network, a metropolitan area network or a local area network. The terminal 304 is not limited to a personal computer (PC), a mobile phone, a tablet computer, or the like. The data processing method may be performed by the server 302, or may be performed by the terminal 304, or may be performed by the server 302 together with the terminal 304. That the data processing method in this embodiment of the present disclosure is performed by the terminal 304 may be that the data processing method is performed by a client installed on the terminal 304.

Figure 4:
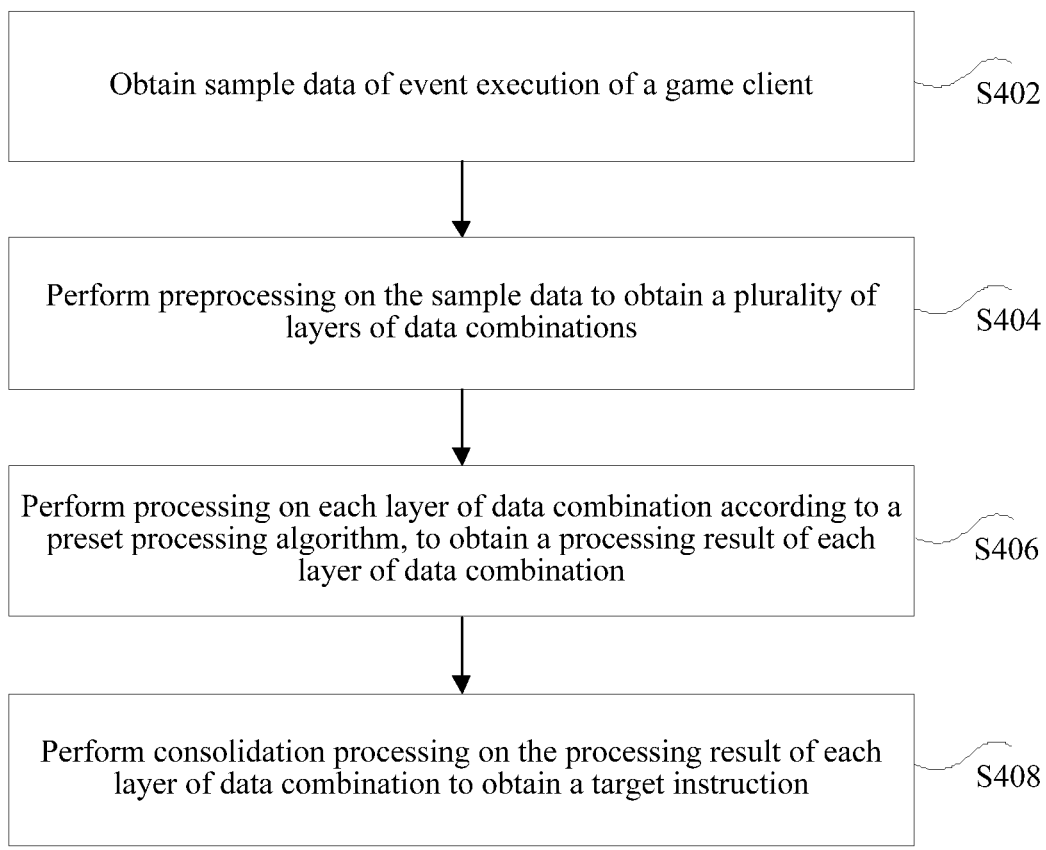
FIG. 4 is a flowchart of a data processing method according to an embodiment of the present disclosure.

FIG. 4 is a flowchart of a data processing method according to an embodiment of the present disclosure. As shown in FIG. 4, the data processing method may include the followings.

S402: Obtaining sample data of event execution of a game client.

The game client is used for executing an event, for example, executing an event in a human-computer battle mode in a real-time game. The real-time game is different from a turn-based game.

Data is generated during the event execution of the game client. The data may be game data. The sample data is a part of data actually observed or surveyed during the event execution of the game client, and may be data randomly extracted, having an adequate quantity and capable of reflecting a general situation of the event execution of the game client. In one embodiment, alternatively, the data generated during the event execution of the game client may be properly constructed by using a multi-layer deep learning framework, to obtain the sample data.

Optionally, when sample data of event execution of a game client is obtained, the sample data is an input sample and may be a game sample. The game sample includes a plurality of sample sequences. The plurality of sample sequences has different priorities, and the sample sequences having different priorities may include a same data frame.

S404: Performing preprocessing on the sample data to obtain a plurality of layers of data combinations.

That is, preprocessing is performed on the sample data to obtain a plurality of layers of data combinations, each layer of the plurality of layers of data combinations corresponding to a target event object in a same target event, different layers of the plurality of layers of data combinations corresponding to different target event objects in the target event, and the target event objects being event objects on the game client to be executed concurrently.

Because there is a large number of design dimensions of game data, the game data cannot be directly used as training data. After the sample data of the event execution of the game client is obtained, a plurality of sample sequences of the sample data is obtained, and the sample data is tagged according to the plurality of sample sequences, to obtain tagged sample data. The sample data may be tagged by using a preset tagging logic. Optionally, the entire sample is tagged according to a characteristic sequence of the input sample and according to the preset logical configuration, to obtain the tagged sample data.

Because of complexity of data processing rules, a plurality of sample sequences may have a same data frame, that is, a same data frame may belong to a plurality of sample sequences. The priorities of the plurality of sample sequences may be determined according to a characteristic of the event. Different sample sequences are tagged according to an order of the priorities of the sample sequences. The sample sequences may be tagged by using a preset rule or a preset sample segmentation algorithm, to obtain a tagging frame. All tagging frames are traversed and neighboring and same tagging frames are tagged into one sample sequence. A start frame and an end frame of each sample sequence are tagged, to obtain the tagged sample data.

After the sample data is tagged according to the plurality of sample sequences of the sample data to obtain tagged sample data, preprocessing is performed on the tagged sample data to obtain a plurality of layers of data combinations. The plurality of layers of data combinations may be formed by assembling state information extracted from the tagged sample data by using a common state function. For example, current event state information may be extracted from the tagged sample data by using a common state function. The state information is assembled to form a plurality of layers of data combinations. The target event objects are event objects on the game client to be executed concurrently, and may correspond to an own-side character state, a friendly-side character state, adversary-side lethality information, map information, non-player character (NPC) information, and the like.

Each layer of the plurality of layers of data combinations in one embodiment corresponds to a target event object in a same target event, and different layers of the plurality of layers of data combinations correspond to different target event objects in the target event. That is, there is a one-to-one correspondence between each layer of the plurality of layers of data combinations and a target event object in a same target event. For example, the target event is a battle event, and the target event objects include an A event object, a B event object, and a C event object to be executed concurrently. The A event object, the B event object, and the C event object are different, and a first layer of data combination corresponds to the A event object in the battle event, a second layer of data combination corresponds to the B event object in the battle event, and a third layer of data combination corresponds to the C event object in the battle event.

For another example, the event objects to be executed concurrently include an own-side character, a friendly-side character, an adversary-side character, and an NPC. Each layer of data combination corresponds to the own-side character, the friendly-side character, the adversary-side character, the NPC, and the like. Different layers of the plurality of layers of data combinations in one embodiment correspond to different target event objects in the target event. For example, in a real-time game in which there are five persons in each party, own-side character states are placed on a first layer; friendly-side character states are ranked according to strength and placed on a second layer to a fifth layer. That is, on the second layer to the fifth layer, the friendly-side characters are differentiated according to the strength; adversary-side characters are ranked according to lethality and placed on a sixth layer to a tenth layer. That is, on the sixth layer to the tenth layer, the adversary-side characters are differentiated according to the lethality; map information and NPC information are placed on an outermost layer. Other data assembling principles are also applicable, and are not limited herein.

The state information of the sample data and each piece of character data on each layer of data combination are mapped to a legal action space according to a game rule state, to obtain event data. The state information, the character data, and the event data on each layer of data combination are assembled to form sample information on each layer of data combination. Rotation processing is performed on the sample data, to extend the sample quantity corresponding to the sample data. Other user information may also be added to the sample information. For example, an error rate and an operating frequency of the event execution are added to the sample information, thereby facilitating training. In this way, the plurality of layers of data combinations is obtained by performing preprocessing on the tagged sample data.

S406: Performing processing on each layer of data combination according to a preset processing algorithm, to obtain a processing result of each layer of data combination.

Each layer of the plurality of layers of data combinations has a corresponding preset processing algorithm. The preset processing algorithm may be learning, on each layer of data combination according to the sample information, a probability model of an execution probability of an event and a value model of an execution value of the event in the current state information. For example, each of current event state information, character information, and a character in a sample is mapped to a corresponding numerical value in a legitimate action space according to a game rule state, to learn an execution probability model of an action and a value model of the action in the current state. A specific algorithm may be an MCTS algorithm used in AlphaGo for consolidating a policy network and a value network.

The MCTS algorithm is a heuristic search algorithm for decision making and selects a most profitable behavior by extending a search tree and simulation, thereby making an optimal decision and obtaining a processing result of each layer of data combination. The processing result is output on a decision layer for performing consolidation processing and is a result obtained by performing processing on each layer of data combination according to a preset processing algorithm. The processing result includes an execution probability and an execution value. Processing may be performed on the sample information on each layer of data combination according to a preset probability model and a preset value model corresponding to each layer of data combination, to obtain an execution probability and an execution value that are of execution of the target event of the game client and that correspond to each layer of data combination. For example, the preset probability model is an execution probability model of an action, and the preset value model is a value model of the action. Processing is performed on the sample information on each layer of data combination according to the execution probability model of the action and the value model of the action in a current state, to obtain the execution probability and the execution value of execution of the target event of the game client and corresponding to each layer of data combination.

S408: Performing consolidation processing on the processing result of each layer of data combination to obtain a target instruction.

That is, consolidation processing is performed on the processing result of each layer of data combination to obtain a target instruction, and the target instruction is used for instructing the game client to concurrently execute the different target event objects corresponding to the different layers of data combinations.

After the processing result of each layer of data combination is obtained by performing processing on the sample information on each layer of data combination, weighted consolidation is performed on the processing result of each layer of data combination, to obtain a target instruction. The target instruction is a final policy used for instructing the game client to concurrently execute the different target event objects corresponding to the different layers of data combinations. A state evaluation function may be added to the target instruction, to determine whether the target instruction on the current board needs to be changed, so as to satisfy various event execution environments.

Optionally, after the target instruction is obtained by performing consolidation processing on the processing result of each layer of data combination, the target instruction is executed, that is, the final policy is executed. During execution of the target instruction, the state evaluation function may be added, to determine whether the policy on the current board needs to be changed, so as to satisfy various game environments.

Optionally, during the execution the target instruction, current game state information of the game client may be displayed. The current game state information is an execution result of the target instruction. Whether the target instruction needs to be updated is determined according to the preset state evaluation function and the current execution result, and whether the target instruction needs to be updated may be determined by using a behavior tree. The behavior tree is a graphical modeling language and is used for describing different execution conditions and manners of a behavior in a game, thereby ensuring fast execution of the behavior and improving experience of a game player.

Thus, according to S402 to S408, sample data of event execution of a game client is obtained; preprocessing is performed on the sample data to obtain a plurality of layers of data combinations, each layer of the plurality of layers of data combinations corresponding to a target event object in a same target event, different layers of the plurality of layers of data combinations corresponding to different target event objects in the target event, and the target event objects being event objects on the game client to be executed concurrently; processing is performed on the sample information on each layer of data combination according to the processing algorithm corresponding to each layer of the plurality of layers of data combinations, to obtain the processing result of each layer of data combination; and consolidation processing is performed on the processing result of each layer of data combination to obtain a target instruction, the target instruction being used for instructing the game client to concurrently execute the different target event objects corresponding to the different layers of data combinations. In this way, a technical problem of a low data processing efficiency is resolved, and a technical effect of improving data processing efficiency is achieved.

Optionally, in S404, the performing preprocessing on the sample data to obtain a plurality of layers of data combinations includes: tagging the sample data according to a plurality of sample sequences of the sample data, to obtain tagged sample data; and performing preprocessing on the tagged sample data to obtain the plurality of layers of data combinations, different layers of the plurality of layers of data combinations corresponding to different processing algorithms and different sample information. Because the plurality of layers of data combinations uses different algorithms, a decision time length and a simulation depth may compromise with each other, and various game scenarios are satisfied and requirements of different decision time lengths can be handled. Thus, the decision execution is simple and highly efficient, and fast execution of a behavior is ensured.

When performing processing on each layer of data combination according to a preset processing algorithm to obtain a processing result of each layer of data combination, processing may be performed on the sample information on each layer of data combination according to the processing algorithm corresponding to each layer of the plurality of layers of data combinations, to obtain the processing result of each layer of data combination.

Optionally, in S404, the tagging the sample data according to a plurality of sample sequences of the sample data to obtain tagged sample data includes: sequentially tagging each sample sequence according to the priority by using a tagging frame, to obtain a plurality of tagged sample sequences; combining neighboring tagged sample sequences of the plurality of tagged sample sequences according to a same tagging frame, to obtain a combined tagged sample sequence; and tagging a start frame and an end frame of the combined tagged sample sequence, to obtain the tagged sample data.

Figure 5:
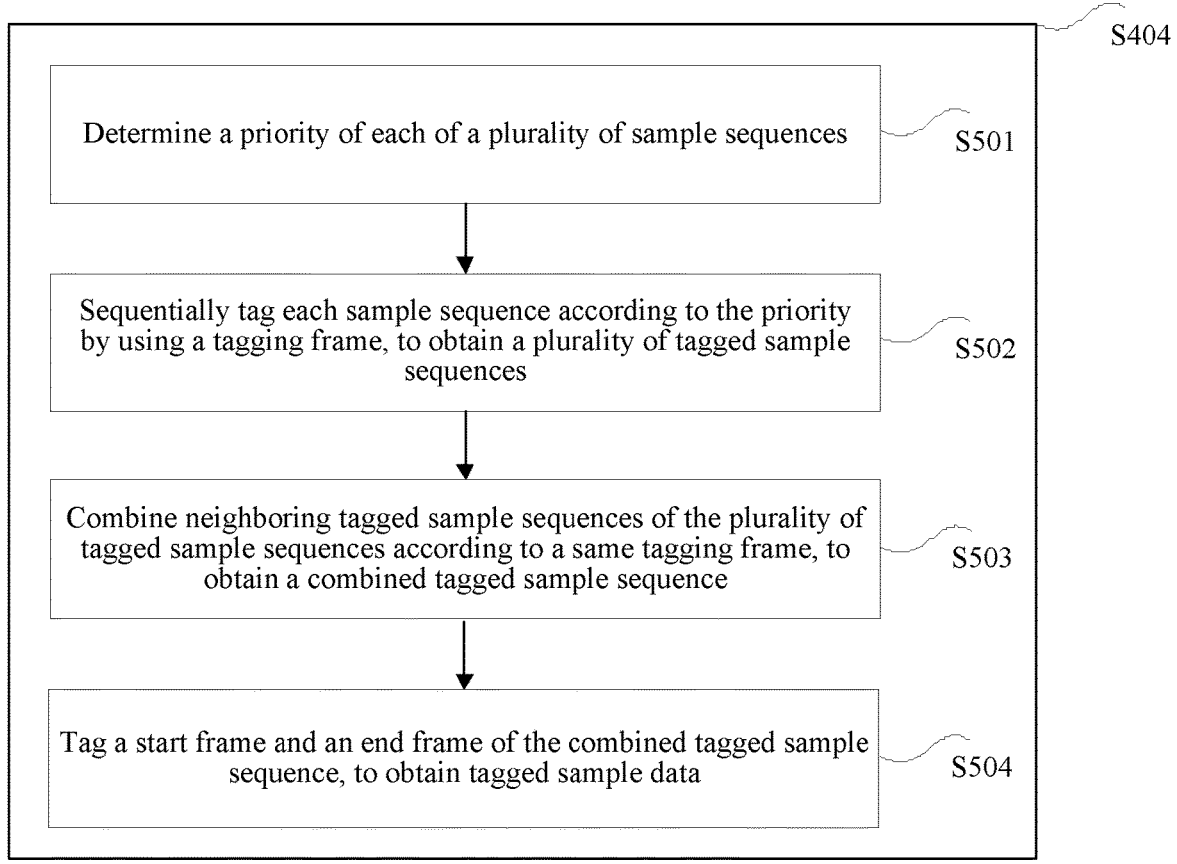
FIG. 5 is a flowchart of a method of tagging sample data according to a plurality of sample sequences of the sample data according to an embodiment of the present disclosure.

FIG. 5 is a flowchart of a method of tagging sample data according to a plurality of sample sequences of the sample data according to an embodiment of the present disclosure. As shown in FIG. 5, the method of tagging sample data according to a plurality of sample sequences of the sample data includes the followings.

S501: Determining a priority of each of the plurality of sample sequences.

The sample data includes a plurality of sample sequences, and each of the plurality of sample sequences has a priority. Because of complexity of an execution rule of an event, a same data frame may belong to a plurality of sample sequences. After the sample data of event execution of the game client is obtained, the priority of each of the plurality of sample sequences is determined, so that a ranking order of the plurality of sample sequences is obtained according to the priority of each sample sequence.

S502: Sequentially tagging each sample sequence according to the priority by using a tagging frame, to obtain a plurality of tagged sample sequences.

That is, each sample sequence is sequentially tagged according to the priority by using a tagging frame, to obtain a plurality of tagged sample sequences. After the priority of each of the plurality of sample sequences is determined, different sample sequences may be tagged by using tagging frames according to the ranking order of the plurality of sample sequences. Optionally, the different sample sequences are tagged by using a preset rule or a preset sample segmentation algorithm and the tagging frames and according to the ranking order of the plurality of sample sequences, to obtain the plurality of tagged sample sequences.

S503: Combining neighboring tagged sample sequences of the plurality of tagged sample sequences according to a same tagging frame, to obtain a combined tagged sample sequence.

After the plurality of tagged sample sequences is obtained by sequentially tagging each sample sequence according to the priority by using a tagging frame, neighboring tagged sample sequences of the plurality of tagged sample sequences are combined according to a same tagging frame, to obtain a combined tagged sample sequence. Tagging frames of a plurality of tagged sample sequences may be traversed, and sample sequences of neighboring and same tagging frames are tagged as a same sequence, to obtain a combined tagged sample sequence.

S504: Tagging a start frame and an end frame of the combined tagged sample sequence, to obtain tagged sample data.

After the combined tagged sample sequence is obtained by combining neighboring tagged sample sequences of the plurality of tagged sample sequences according to a same tagging frame, a start frame and an end frame of the combined tagged sample sequence may be tagged, to obtain the tagged sample data.

According to one embodiment, a priority of each of the plurality of sample sequences is determined; each sample sequence is sequentially tagged according to the priority by using a tagging frame, to obtain a plurality of tagged sample sequences; neighboring tagged sample sequences of the plurality of tagged sample sequences are combined according to a same tagging frame, to obtain a combined tagged sample sequence; and a start frame and an end frame of the combined tagged sample sequence are tagged, to obtain the tagged sample data. In this way, the tagged sample data is obtained by tagging the sample data according to a plurality of sample sequences of the sample data.

Optionally, in S404, the performing preprocessing on the tagged sample data to obtain the plurality of layers of data combinations includes: assembling different state information of execution of a current event object of the game client, to obtain the plurality of layers of data combinations.

Figure 6:
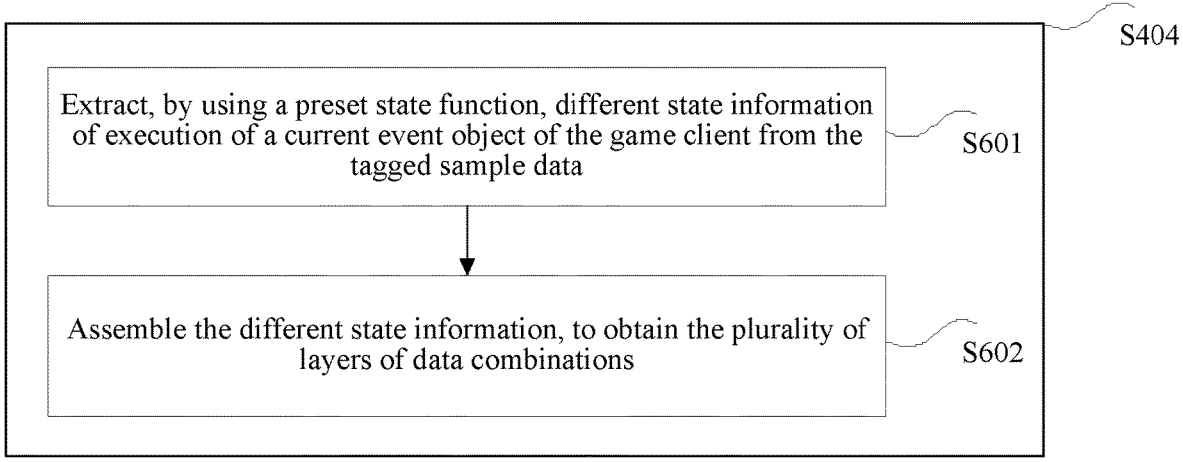
FIG. 6 is a flowchart of a method of performing preprocessing on tagged sample data according to an embodiment of the present disclosure.

FIG. 6 is a flowchart of a method of performing preprocessing on tagged sample data according to an embodiment of the present disclosure. As shown in FIG. 6, the method of performing preprocessing on tagged sample data includes the followings.

S601: Extracting, by using a preset state function, different state information of execution of a current event object of the game client from the tagged sample data.

After the tagged sample data is obtained by tagging the sample data according to a plurality of sample sequences of the sample data, different state information on the current board is extracted from the tagged sample data by using a common state function. The different state information may be used for indicating state information during real-time game playing of the game client, for example, an own-side character state, a friendly-side character state, and an adversary-side character state. The current event object is an event object currently executed by the game client.

S602: Assembling the different state information to obtain the plurality of layers of data combinations.

After the different state information of execution of a current event object of the game client is extracted, by using a preset state function, from the tagged sample data, the different state information is assembled, for example, state information such as an own-side character state, a friendly-side character state, and an adversary-side character state are assembled, to obtain the plurality of layers of data combinations, each layer of the plurality of layers of data combinations corresponding to a target event object in a same target event, different layers of the plurality of layers of data combinations corresponding to different target event objects in the target event, and the target event objects being event objects on the game client to be executed concurrently.

For example, in a real-time game in which there are five persons in each party, own-side character states are placed on a first layer; friendly-side character states are ranked according to strength and placed on a second layer to a fifth layer; adversary-side character states are ranked according to lethality and placed on a sixth layer to a tenth layer; map information and NPC information are placed on an outermost layer. Other data assembling methods are also applicable.

According to one embodiment, different state information of execution of a current event object of the game client is extracted, by using a preset state function, from the tagged sample data, the current event object being an event object currently executed by the game client; and the different state information is assembled, to obtain the plurality of layers of data combinations. In this way, the plurality of layers of data combinations is obtained by performing preprocessing on the tagged sample data, thereby improving data processing efficiency.

Optionally, before the performing processing on the sample information on each layer of data combination according to the processing algorithm corresponding to each layer of the plurality of layers of data combinations, to obtain the processing result of each layer of data combination, the sample information is generated according to the state information, the character data on the game client and the event data of the target event.

Figure 7:
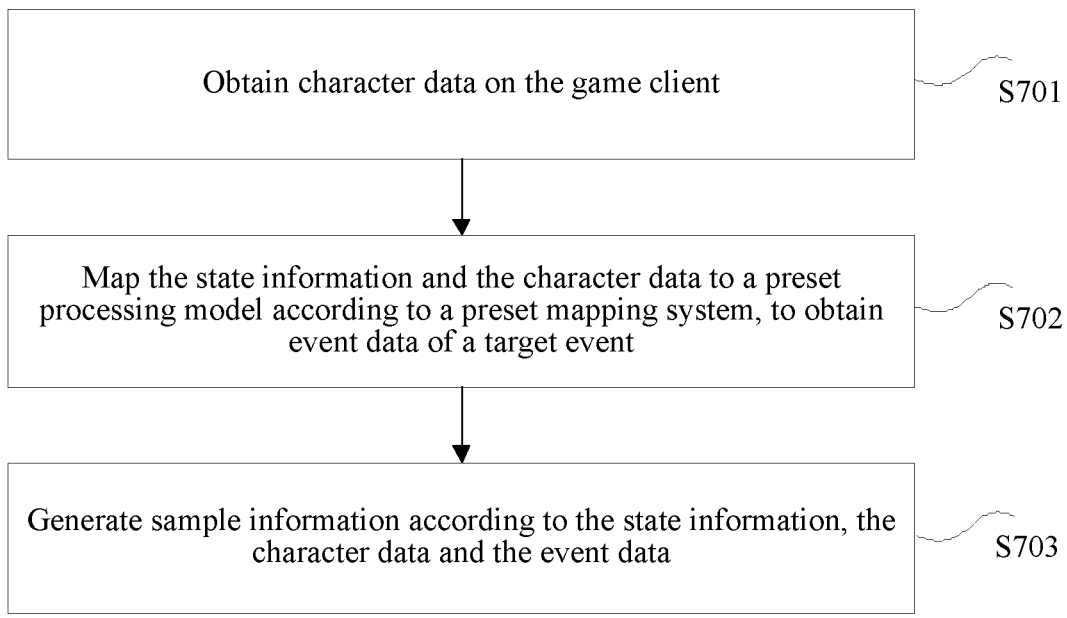
FIG. 7 is a flowchart of another data processing method according to an embodiment of the present disclosure.

FIG. 7 is a flowchart of another data processing method according to an embodiment of the present disclosure. As shown in FIG. 7, the data processing method includes the followings.

S701: Obtaining character data on the game client.

There is character data when the game client executes the target event. The character data is used for representing data of a virtual application entity executing the target event. The character data includes a plurality of pieces of character data. Each piece of character data corresponds to data of a virtual application entity, and each piece of character data on the game client is obtained.

S702: Mapping the state information and the character data to a preset processing model according to a preset mapping system, to obtain event data of a target event.

The state information and the character data may be mapped to a legitimate action space by using a game rule state. The action space has event data of the target event corresponding to the state information and the character data. The event data may be action data, so that the event data of the target event is obtained by using the state information, the character data and the legitimate action space.

S703: Generating sample information according to the state information, the character data, and the event data.

After the event data of the target event is obtained by mapping the state information and the character data to a preset processing model according to a preset mapping system, the sample information is generated according to the state information, the character data and the event data. The sample information includes frame information. Each piece of event data corresponds to one piece of sample information. For example, the state information, the character data and the event data are represented by using <S, u, a>. S is used for representing the state information, u is used for representing the character data, and a is used for representing the event data.

Thus, according to one embodiment, character data on the game client is obtained; the state information and the character data are mapped to a preset processing model according to a preset mapping system, to obtain event data of the target event; the sample information is generated according to the state information, the character data and the event data, and then processing is performed on the sample information on each layer of data combination according to the processing algorithm corresponding to each layer of the plurality of layers of data combinations, to obtain the processing result of each layer of data combination. In this way, data processing efficiency is improved.

Optionally, after the sample information is generated according to the state information, the character data and the event data, preset information is added to sample information of the extended samples.

Figure 8:
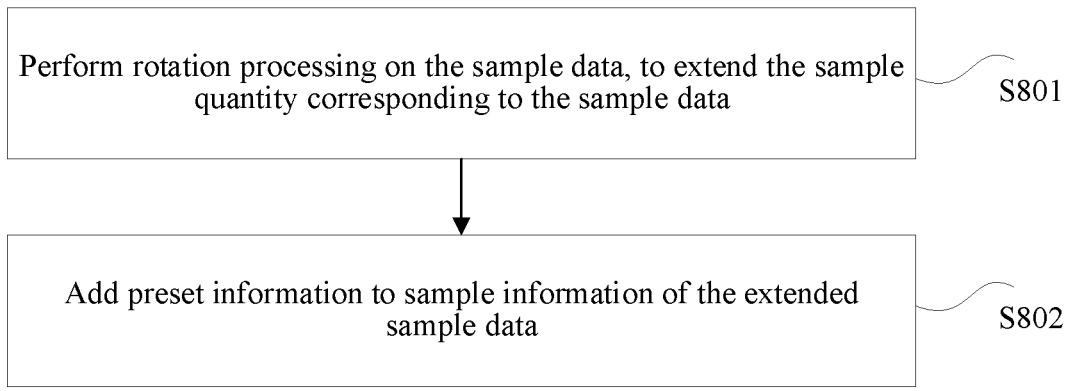
FIG. 8 is a flowchart of another data processing method according to an embodiment of the present disclosure.

FIG. 8 is a flowchart of another data processing method according to an embodiment of the present disclosure. As shown in FIG. 8, the data processing method further includes the followings.

S801: Performing rotation processing on the sample data, to extend the sample quantity corresponding to the sample data.

After the sample information is generated according to the state information, the character data and the event data, rotation processing is performed on the sample data, to extend the sample quantity corresponding to the sample data to a predetermined number of sample data.

S802: Adding preset information to the predetermined number of sample information.

After the sample quantity corresponding to the sample data is extended by performing rotation processing on the sample data, preset information is added to sample information of the predetermined number of sample data. The preset information may be other user information, for example, information such as an error rate or an operating frequency. The information such as the error rate or the operating frequency is added to the frame information, to facilitate training of a personalized policy.

Optionally, in S406, the performing processing on the sample information on each layer of data combination according to the processing algorithm corresponding to each layer of the plurality of layers of data combinations to obtain the processing result of each layer of data combination includes: performing processing on the sample information on each layer of data combination according to a preset probability model and a preset value model corresponding to each layer of data combination, to obtain an execution probability and an execution value that are of execution of the target event of the game client and that correspond to each layer of data combination, and obtaining a target instruction according to the execution probability corresponding to each layer of data combination and the execution value corresponding to each layer of data combination.

Figure 9:
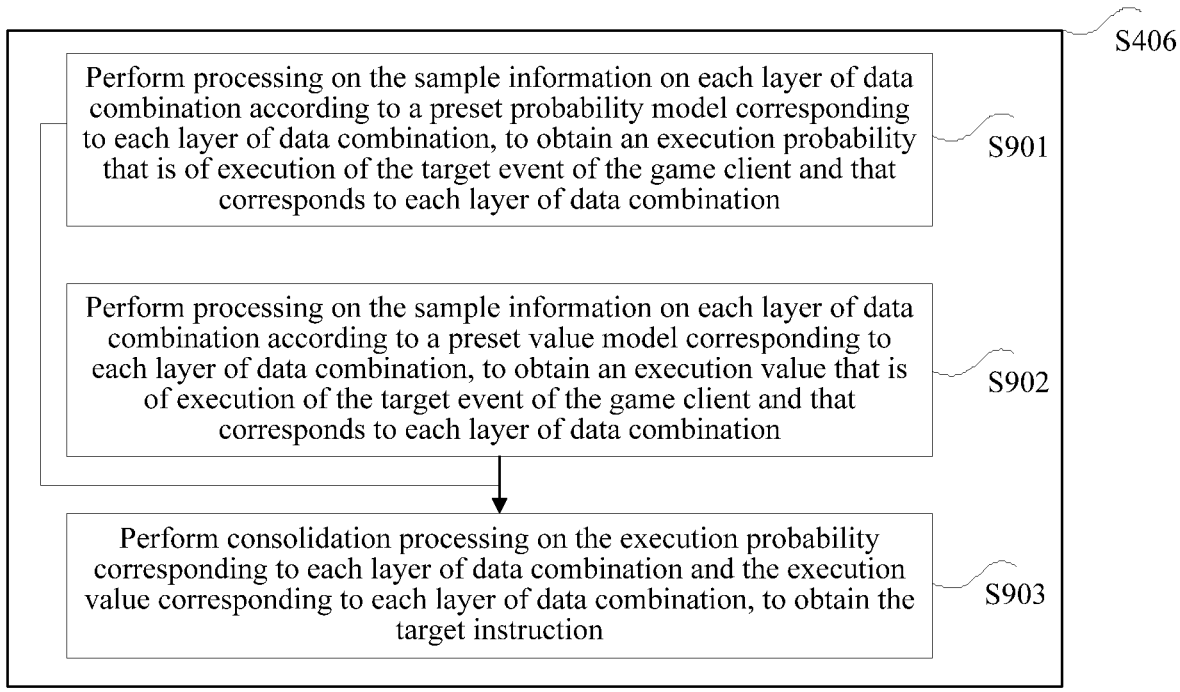
FIG. 9 is a flowchart of a method of performing processing on sample information on each layer of data combination according to a processing algorithm corresponding to each layer of a plurality of layers of data combinations according to an embodiment of the present disclosure.

FIG. 9 is a flowchart of a method of performing processing on sample information on each layer of data combination according to a processing algorithm corresponding to each layer of a plurality of layers of data combinations according to an embodiment of the present disclosure. As shown in FIG. 9, the method includes the followings.

S901: Performing processing on the sample information on each layer of data combination according to a preset probability model corresponding to each layer of data combination, to obtain an execution probability that is of execution of the target event of the game client and that corresponds to each layer of data combination.

In the technical solution provided in S901 in this application, each layer of data combination corresponds to a preset probability model, and each layer of data combination learns, according to the sample information of each layer of data combination, a preset probability model of action execution in the current state, to obtain an execution probability that is of execution of the target event of the game client and that corresponds to each layer of data combination.

S902: Performing processing on the sample information on each layer of data combination according to a preset value model corresponding to each layer of data combination, to obtain an execution value that is of execution of the target event of the game client and that corresponds to each layer of data combination.

That is, each layer of data combination corresponds to a preset value model, and each layer of data combination learns, according to the sample information of each layer of data combination, a preset value model of action execution in the current state, to obtain a value probability that is of execution of the target event of the game client and that corresponds to each layer of data combination.

S903: Performing consolidation processing on the execution probability corresponding to each layer of data combination and the execution value corresponding to each layer of data combination, to obtain the target instruction.

After the execution probability that is of execution of the target event of the game client and that corresponds to each layer of data combination and the execution value that is of execution of the target event of the game client and that corresponds to each layer of data combination are obtained, consolidation processing is performed on the execution probability corresponding to each layer of data combination and the execution value corresponding to each layer of data combination, to obtain the target instruction. A final policy is outputted. A state evaluation function is added during execution of the policy. In this way, whether the policy on the current board needs to be changed is determined and various event execution environments are handled.

Thus, according to one embodiment, processing is performed on the sample information on each layer of data combination according to a preset probability model corresponding to each layer of data combination, to obtain an execution probability that is of execution of the target event of the game client and that corresponds to each layer of data combination; and processing is performed on the sample information on each layer of data combination according to a preset value model corresponding to each layer of data combination, to obtain an execution value that is of execution of the target event of the game client and that corresponds to each layer of data combination. In this way, the processing result of each layer of data combination is obtained by performing processing on the sample information on each layer of data combination according to the processing algorithm corresponding to each layer of the plurality of layers of data combinations, and the target instruction is obtained by performing consolidation processing on the execution probability corresponding to each layer of data combination and the execution value corresponding to each layer of data combination, thereby improving data processing efficiency.

Optionally, after the target instruction is obtained by performing consolidation processing on the processing result of each layer of data combination, the target instruction is updated if the target instruction needs to be updated.

Figure 10:
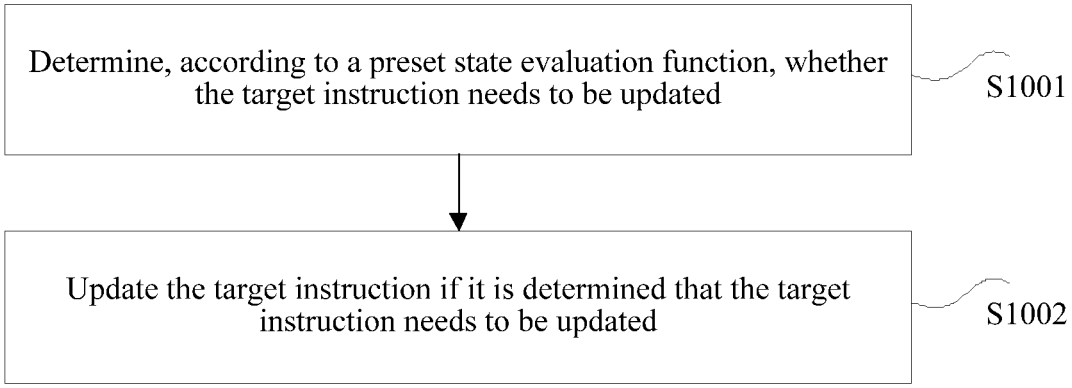
FIG. 10 is a flowchart of another data processing method according to an embodiment of the present disclosure.

FIG. 10 is a flowchart of another data processing method according to an embodiment of the present disclosure. As shown in FIG. 10, the data processing method includes the followings.

S1001: Determining, according to a preset state evaluation function, whether the target instruction needs to be updated.

After the target instruction is obtained by obtaining a processing result of each layer of data combination and performing consolidation processing on the processing result of each layer of data combination, the target event is executed according to the target instruction, and corresponding game state information is returned. Whether the target instruction needs to be updated is determined according to a preset state evaluation function, and whether the target instruction needs to be updated may be determined by using a behavior tree.

S1002: Updating the target instruction if it is determined that the target instruction needs to be updated.

After it is determined, according to a preset state evaluation function, whether the target instruction needs to be updated, the target instruction is updated if it is determined that the target instruction needs to be updated, thereby handling various event processing environments.

Thus, according to one embodiment, after the target instruction is obtained by performing consolidation processing on the processing result of each layer of data combination, whether the target instruction needs to be updated is determined according to a preset state evaluation function, and the target instruction is updated if it is determined that the target instruction needs to be updated, thereby improving data processing efficiency.

Optionally, after the target instruction is obtained by performing consolidation processing on the processing result of each layer of data combination, the processing result of each layer of data combination is updated according to different target state information during execution of the different target event objects according to the target instruction, to obtain an updated processing result of each layer of data combination, and consolidation processing is performed on the updated processing results of the plurality of layers of data combinations, to obtain an updated target instruction.

Figure 11:
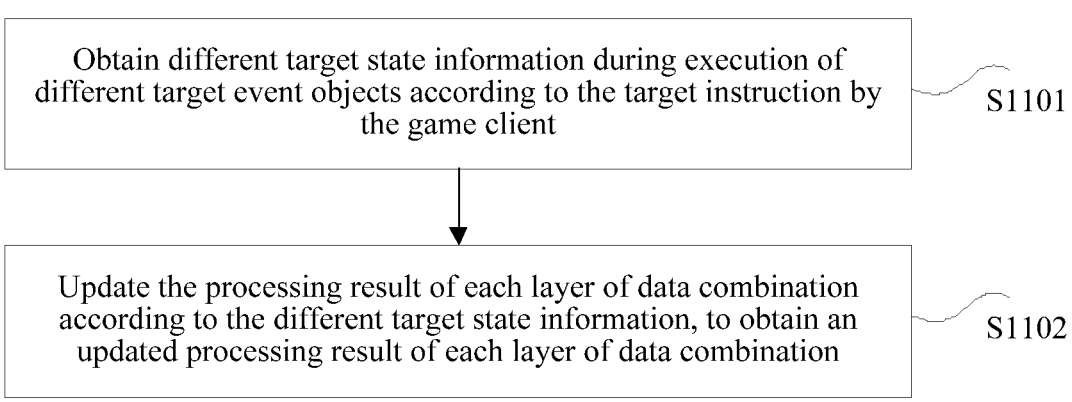
FIG. 11 is a flowchart of another data processing method according to an embodiment of the present disclosure.

FIG. 11 is a flowchart of another data processing method according to an embodiment of the present disclosure. As shown in FIG. 11, the data processing method includes the followings.

S1101: Obtaining different target state information during execution of different target event objects according to the target instruction by the game client.

After the target instruction is obtained by obtaining a processing result of each layer of data combination and performing consolidation processing on the processing result of each layer of data combination, the game client executes different target event objects according to the target instruction and obtains different target state information during execution of the different target event objects according to the target instruction by the game client.

S1102: Updating the processing result of each layer of data combination according to the different target state information, to obtain an updated processing result of each layer of data combination.

After the different target state information during execution of the different target event objects according to the target instruction by the game client is obtained, the processing result of each layer of data combination is updated according to the different target state information, to obtain an updated processing result of each layer of data combination. After the updated processing result of each layer of data combination is obtained, consolidation processing is performed on the updated processing result s of the plurality of layers of data combinations, to obtain an updated target instruction.

Thus, according to one embodiment, the different target state information during execution of the different target event objects according to the target instruction by the game client is obtained, and the processing result of each layer of data combination is updated according to the different target state information, to obtain an updated processing result of each layer of data combination, thereby improving data processing efficiency.

The following describes the technical solutions in the present disclosure with reference to an embodiment. Specifically, a game intelligent system is used as an example for description.

A real-time game is generally characterized as having complex game rules, various dynamic scenarios, uncertain behaviors, incomplete information, short decision time, a success probability, and the like. Considering such a large decision space and a requirement of real-timeliness of decision, how to set, select, and execute a policy is a primary problem faced by the game intelligent system. In a turn-based game, the method of using a plurality of deep learning networks is proved to have a relatively strong decision capability. However, this method cannot be directly applied to a real-time game. Deep learning is a neural network algorithm using a plurality of complex structures or non-linear transformation processing layers, and has a high-level abstraction capability better than that of a shallow neural network. The real-time game is a type of game in which a game process is performed instantly instead of turn-based, such as the game of Go or chess.

According to one embodiment, the policy selection is dispersed to a plurality of layers, so that a large number of flattened data can be learned in a dispersed manner. In this way, the dimension of the state space is reduced, and different algorithms may be used on different layers. Accordingly, the decision time length and the simulation depth may compromise with each other, so that various game scenarios are satisfied.

According to one embodiment, a decision process of a human player is simulated, and an entire intelligent system is divided into three modules: a decision selection module, a decision execution module and a feedback optimization module, so that the system can handle various complex scenarios in a real-time game. Macroscopically, considering the problem of decision depth of a game player, decision learning is performed by selecting a proper data sample and algorithm according to different levels of abstraction downward, thereby reducing complexity of an operation. Microcosmically, decision is executed by using fast and simple algorithms, and the result can be fed back, avoiding excessively much consideration to decision. Such method may be applied to a human-computer battle mode in a real-time game and may provide more personified artificial-intelligence characters, thereby improving experience of a player.

Figure 12:
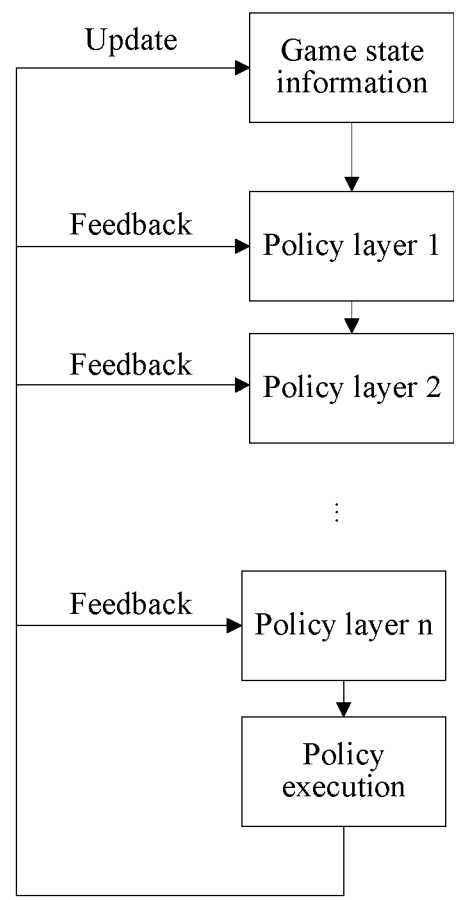
FIG. 12 is a schematic diagram of an interaction process in a game process according to an embodiment of the present disclosure.

FIG. 12 is a schematic diagram of an interaction process in a game process according to an embodiment of the present disclosure. As shown in FIG. 12, in one embodiment, policy selection and policy execution are separated. The decision layer includes a policy layer 1, a policy layer 2, . . . , a policy layer n, thereby having a relatively big depth and capable of simulating a game decision path of a player. The policy execution module focuses on execution efficiency without making excessively many decisions, and performs optimization on feedbacks.

Figure 13:
FIG. 13 is a flowchart of another method of tagging sample data according to a plurality of sample sequences of the sample data according to an embodiment of the present disclosure.

Because there is a large number of design dimensions of game data, the game data cannot be directly used as training data and needs to be tagged according to a preset rule. A main method is to tag an entire sample according to a characteristic sequence of the input sample and a preset logical configuration. FIG. 13 is a flowchart of another method of tagging sample data according to a plurality of sample sequences of the sample data according to an embodiment of the present disclosure. As shown in FIG. 13, the method of tagging sample data according to a plurality of sample sequences of the sample data includes the followings.

S1301: Determining priorities of sample sequences according to characteristics of a game, to obtain a sample sequence order.

Due to complexity of a game rule, a same frame may belong to various sequences. Therefore, priorities of sample sequences need to be determined according to characteristics of a game at the beginning.

S1302: Tagging different sequences according to the sample sequence order.

After the sample sequence order is obtained by determining priorities of sample sequences according to characteristics of a game, different sequences are tagged according to the sample sequence order. The different sequences may be tagged according to the sample sequence order by using a preset rule or a sample segmentation algorithm.

S1303: Traversing all tagging frames.

After the different sequences are tagged according to the sample sequence order, all tagging frames are traversed, and a first sequence backward having a tagging frame is tagged.

S1304: Tagging neighboring and same frames as a same sequence.

During traversing of all frames, neighboring and same frames are tagged as a same sequence.

S1305: Tagging a start frame and an end frame of each sequence.

After the neighboring and same frames are tagged as a same sequence, a start frame and an end frame of each sequence are tagged.

According to one embodiment, priorities of sample sequences are determined according to characteristics of a game, to obtain a sample sequence order; different sequences are tagged according to the sample sequence order; all tagging frames are traversed; neighboring and same frames are tagged as a same sequence; and a start frame and an end frame of each sequence are tagged. In this way, the sample data is tagged according to a plurality of sample sequences of the sample data.

Figure 14:
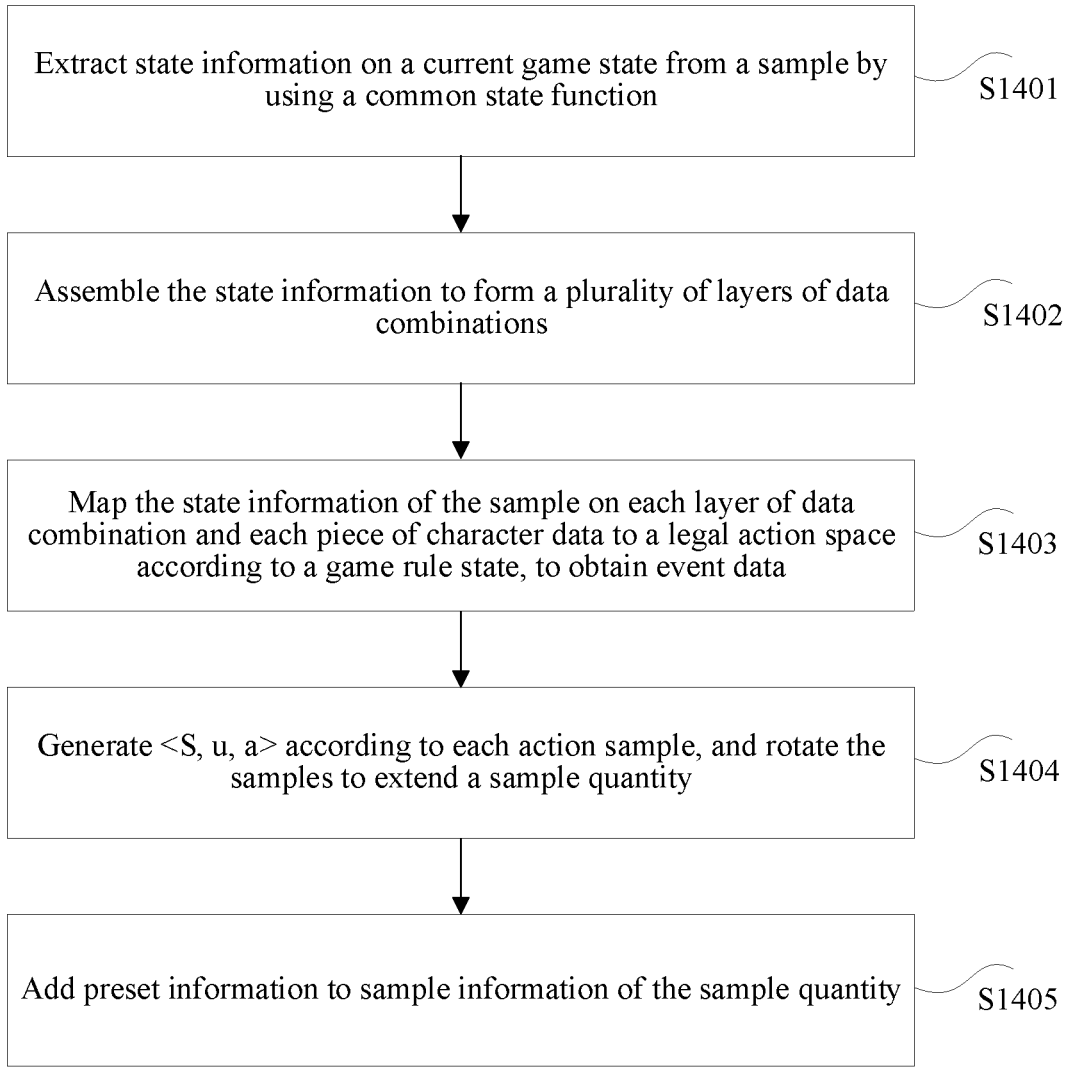
FIG. 14 is a flowchart of another data processing method according to an embodiment of the present disclosure.

FIG. 14 is a flowchart of another data processing method according to an embodiment of the present disclosure. As shown in FIG. 14, the method of performing preprocessing on tagged sample data includes the followings.

S1401: Extracting state information on a current game state from a sample by using a common state function.

That is, the state information on a current game state extracted from a sample by using a common state function is referred to as an S state.

S1402: Assembling the state information to form a plurality of layers of data combinations.

After the state information on the current game state is extracted from the sample by using the common state function, the state information is assembled to form the plurality of layers of data combinations. It is assumed that in a real-time game in which there are five persons in each party, own-side character states are placed on a first layer; friendly-side character states are ranked according to strength and placed on a second layer to a fifth layer; adversary-side characters are ranked according to lethality and placed on a sixth layer to a tenth layer; map information and NPC information are placed on an outermost layer. Other data assembling principles are also applicable.

S1403: Mapping the state information of the sample on each layer of data combination and each piece of character data to a legitimate action space according to a game rule state, to obtain event data.

After the state information is assembled to form the plurality of layers of data combinations, the state information of the sample on each layer of data combination and each piece of character data u are mapped to a legitimate action space according to a game rule state, to obtain event data a.

S1404: Generating <S, u, a> according to each action sample, and rotate the samples to extend the sample quantity.

After the event data a is obtained, <S, u, a> is generated according to the state information S, the character data u and the event data a of each action sample, and the samples are rotated to extend a predetermined number of samples.

S1405: Adding preset information to sample information of the extended predetermined number of sample data.

Other user information such as an error rate is added. An operating frequency may also be added to frame information, to facilitate training of personalized AI.

An execution probability model of an action and a value model of the action in the current state are learned according to the <S, u, a> information on each decision layer. For an algorithm, refer to AlphaGo in which a policy network and a value network are consolidated by using an MCTS algorithm. Output on each decision layer is weighted and consolidated, so that a final policy is obtained. A state evaluation function may be added to the policy, to determine whether the policy on the current game state needs to be changed, so as to satisfy various game environments.

During policy execution, corresponding game state information is returned, so that a policy selection module performs updating and learning. The algorithm may be a behavior tree.

One embodiment provides a multi-layer intelligent system architecture, that is, a construction concept of dividing an intelligent system into a plurality of decision layers, to simulate a multi-layer abstract decision behavior of a player in an actual game. Decision selection and decision execution are separated to handle requirements of a real-time game. A multi-layer deep learning framework is used in the decision layers, to properly construct samples and tag and process sample policy sequences. In addition, requirements of different decision time lengths may be handled, the decision execution is simple and highly efficient, and fast execution of a behavior is ensured, thereby improving data processing efficiency. The entire system simulates a thinking process of a player, so that capability of AI can be effectively improved, thereby improving user experience of a game player.

Figure 15:
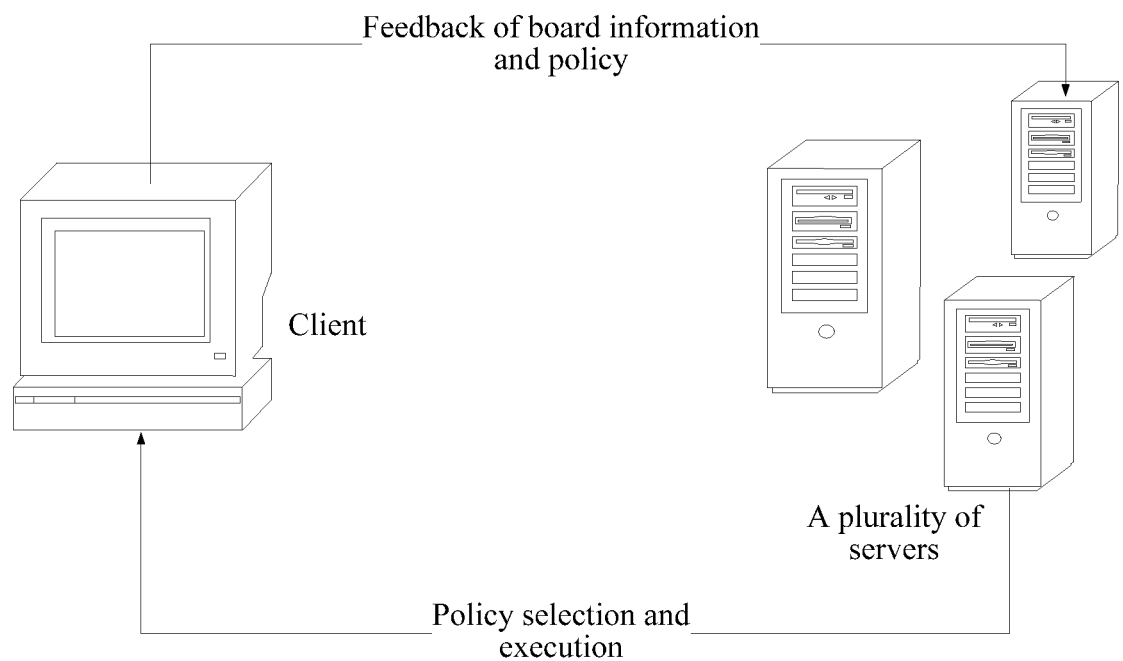
FIG. 15 is a schematic flowchart of a game interaction method according to an embodiment of the present disclosure.

The technical solutions in the present disclosure may be applied to a human-computer battle in a real-time game and may provide more personified artificial-intelligence characters, thereby improving experience of a player. FIG. 15 is a schematic flowchart of a game interaction method according to an embodiment of the present disclosure.

As shown in FIG. 15, a game client obtains a current game state, and sends the current game state to a policy selection server by using a network. The policy selection server includes a plurality of servers, performs policy selection by using a model and selects an optimal action and returns the action to the game client. The game client executes a policy according to the optimal action and feeds back game state information and the policy.

According to one embodiment, a decision process of a human player is simulated, and an entire intelligent system is divided into three modules: a decision selection module, a decision execution module and a feedback optimization module, so that the system can handle various complex scenarios in a real-time game. Macroscopically, the problem of decision depth of a game player is considered, and decision learning is performed by selecting a proper data sample and algorithm according to different levels of abstraction downward, thereby reducing complexity of an operation. Microcosmically, decision is executed by using fast and simple algorithms and the result can be fed back, avoiding excessively much consideration to decision. By using the game interaction method, policy selection and policy execution are divided, so that the decision layer has a relatively big depth and a game decision path of a player can be simulated. The execution layer focuses on execution efficiency without making excessively many decisions, thereby improving data processing efficiency.

It should be noted that for each of the foregoing method embodiments, for ease of description, the method embodiment is described as a series of action combinations. However, persons skilled in the art should know that the present disclosure is not limited to the described order of actions, because according to the present disclosure, some steps may be performed in another order or be performed concurrently. In addition, persons skilled in the art should also know that all of the embodiments described in this specification are preferred embodiments, and the related actions and modules are not necessarily required in the present disclosure.

According to the description of the foregoing implementation, persons skilled in the art may clearly learn that the method in the foregoing embodiment may be implemented by relying on software and a necessary common hardware platform or by using hardware, but the former one is a preferred implementation in many cases. Based on such an understanding, the technical solutions in the present disclosure essentially, or the part contributing to the existing technology may be implemented in the form of a software product. The computer software product is stored in a storage medium (for example, a read-only memory (ROM)/ random access memory (RAM), a magnetic disk, or an optical disc) and includes several instructions for instructing a terminal device (which may be a mobile phone, a computer, a server, a network device, or the like) to perform the method described in the embodiments of the present disclosure.

Figure 16:
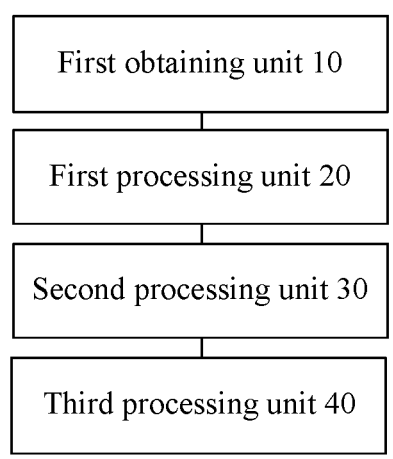
FIG. 16 is a schematic diagram of a data processing apparatus according to an embodiment of the present disclosure.

According to an embodiment of the present disclosure, a data processing apparatus for performing the foregoing data processing method is further provided. FIG. 16 is a schematic diagram of a data processing apparatus according to an embodiment of the present disclosure. As shown in FIG. 16, the data processing apparatus may include: a first obtaining unit 10, a first processing unit 20, a second processing unit 30 and a third processing unit 40.

The first obtaining unit 10 is configured to obtain sample data of event execution of a game client.

The first processing unit 20 is configured to perform preprocessing on the sample data to obtain a plurality of layers of data combinations, each layer of the plurality of layers of data combinations corresponding to a target event object in a same target event, different layers of the plurality of layers of data combinations corresponding to different target event objects in the target event, and the target event objects being event objects on the game client to be executed concurrently.

The second processing unit 30 is configured to perform processing on each layer of data combination according to a preset processing algorithm, to obtain a processing result of each layer of data combination.

The third processing unit 40 is configured to perform consolidation processing on the processing result of each layer of data combination to obtain a target instruction, the target instruction being used for instructing the game client to concurrently execute the different target event objects corresponding to the different layers of data combinations.

It should be noted herein that, the first obtaining unit 10, the first processing unit 20, the second processing unit 30 and the third processing unit 40 may be used as a part of the apparatus and run in a terminal. A processor in the terminal may be used for performing functions implemented by the foregoing modules. The terminal may be a terminal device such as a smartphone (for example, an Android mobile phone or an iOS mobile phone), a tablet computer, a palmtop computer, a mobile Internet device (MID), or a PAD.

It should be noted that, the first obtaining unit 10 in one embodiment may be configured to perform S402, the first processing unit 20 in one embodiment may be configured to perform S404, the second processing unit 30 in one embodiment may be configured to perform S406, and the third processing unit 40 in one embodiment may be configured to perform S408, etc.

Figure 17:
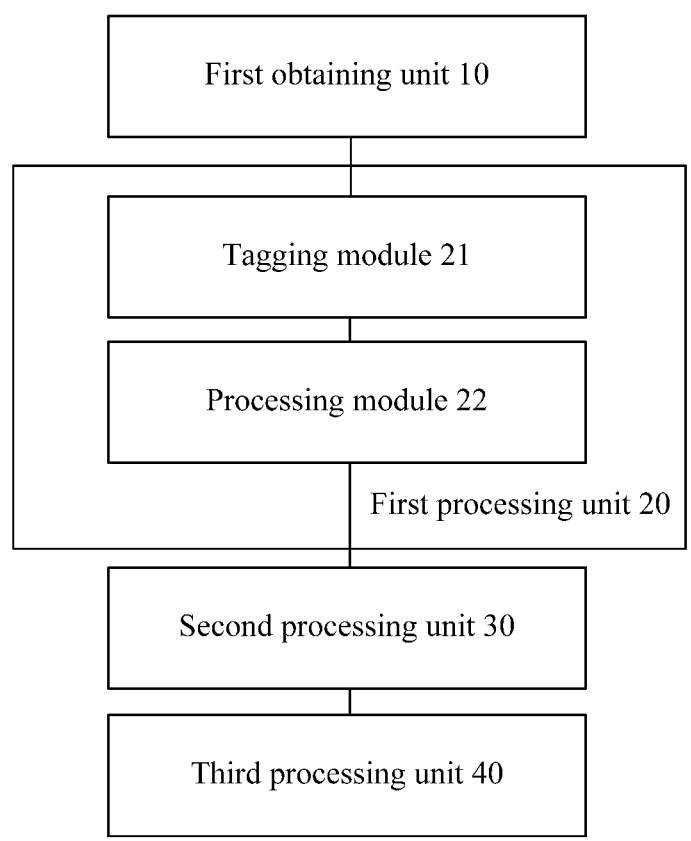
FIG. 17 is a schematic diagram of another data processing apparatus according to an embodiment of the present disclosure.

FIG. 17 is a schematic diagram of another data processing apparatus according to an embodiment of the present disclosure. As shown in FIG. 17, the data processing apparatus may include: a first obtaining unit 10, a first processing unit 20, a second processing unit 30 and a third processing unit 40. The first processing unit 20 includes: a tagging module 21 and a processing module 22.

It should be noted that, the first obtaining unit 10, the first processing unit 20, the second processing unit 30 and the third processing unit 40 in one embodiment play the same role as those in the data processing apparatus in the embodiment shown in FIG. 16, and details are not described herein again.

The tagging module 21 is configured to tag the sample data according to a plurality of sample sequences of the sample data, to obtain tagged sample data.

The processing module 22 is configured to perform preprocessing on the tagged sample data to obtain the plurality of layers of data combinations, different layers of the plurality of layers of data combinations corresponding to different processing algorithms and different sample information.

The second processing unit 30 is configured to perform processing on the sample information on each layer of data combination according to the processing algorithm corresponding to each layer of the plurality of layers of data combinations, to obtain the processing result of each layer of data combination.

It should be noted herein that, the tagging module 21 and the processing module 22 may be used as a part of the apparatus and run in a terminal. A processor in the terminal may be used for performing functions implemented by the foregoing modules. The terminal may be a terminal device such as a smartphone (for example, an Android mobile phone or an iOS mobile phone), a tablet computer, a palmtop computer, an MID, or a PAD.

Figure 18:
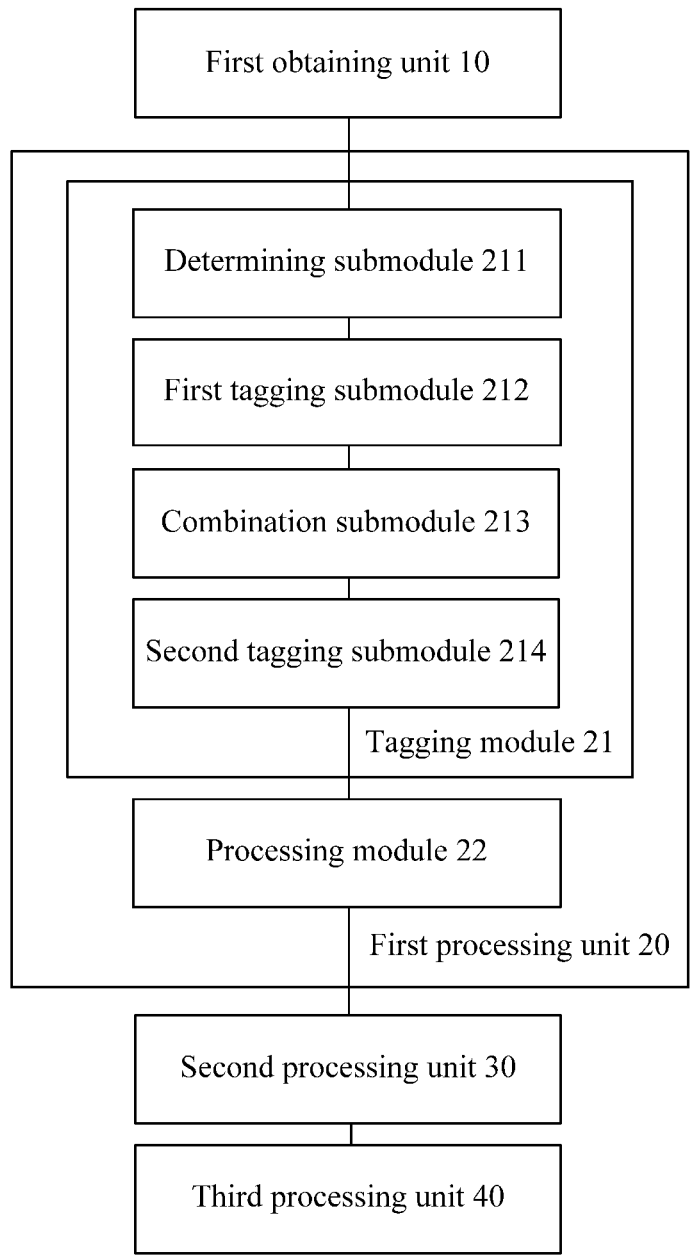
FIG. 18 is a schematic diagram of another data processing apparatus according to an embodiment of the present disclosure.

FIG. 18 is a schematic diagram of another data processing apparatus according to an embodiment of the present disclosure. As shown in FIG. 18, the data processing apparatus may include: a first obtaining unit 10, a first processing unit 20, a second processing unit 30 and a third processing unit 40. The first processing unit 20 includes: a tagging module 21 and a processing module 22. The tagging module 21 includes: a determining submodule 211, a first tagging submodule 212, a combination submodule 213 and a second tagging submodule 214.

It should be noted that, the first obtaining unit 10, the first processing unit 20, the second processing unit 30, the third processing unit 40, the tagging module 21, and the processing module 22 in one embodiment play the same role as those in the data processing apparatus in the embodiment shown in FIG. 17, and details are not described herein again.

The determining submodule 211 is configured to determine a priority of each of the plurality of sample sequences.

The first tagging submodule 212 is configured to sequentially tag each sample sequence according to the priority by using a tagging frame, to obtain a plurality of tagged sample sequences.

The combination submodule 213 is configured to combine neighboring tagged sample sequences of the plurality of tagged sample sequences according to a same tagging frame, to obtain a combined tagged sample sequence.

The second tagging submodule 214 is configured to tag a start frame and an end frame of the combined tagged sample sequence, to obtain the tagged sample data.

It should be noted herein that, the determining submodule 211, the first tagging submodule 212, the combination submodule 213, and the second tagging submodule 214 may be used as a part of the apparatus and run in a terminal. A processor in the terminal may be used for performing functions implemented by the foregoing modules. The terminal may be a terminal device such as a smartphone (for example, an Android mobile phone or an iOS mobile phone), a tablet computer, a palmtop computer, an MID, or a PAD.

Figure 19:
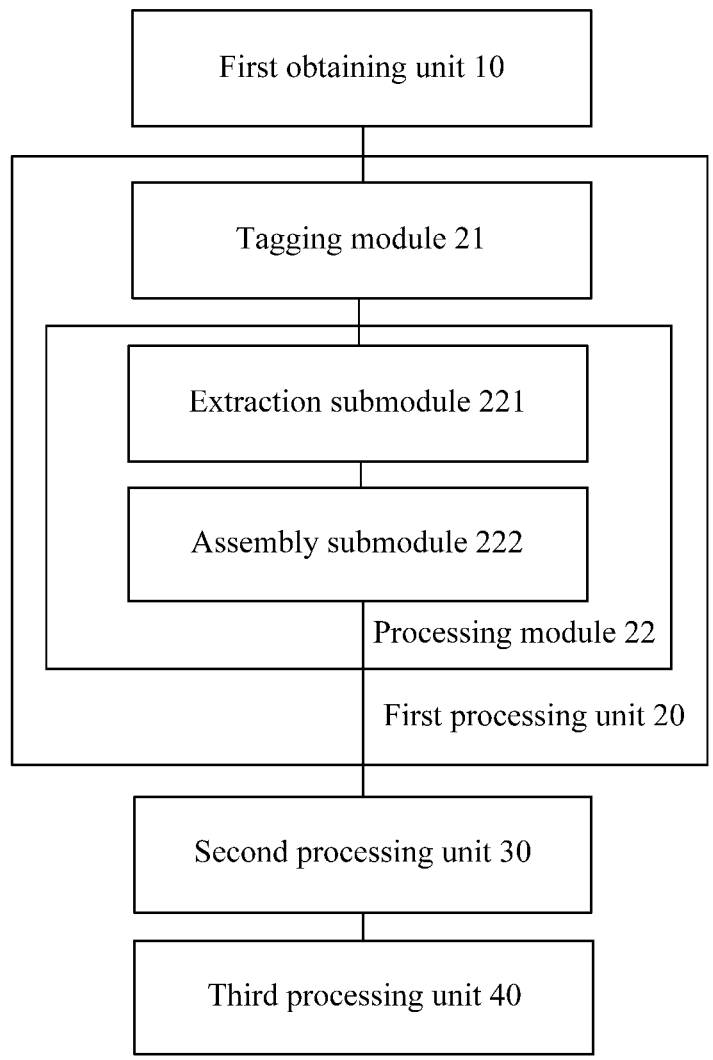
FIG. 19 is a schematic diagram of another data processing apparatus according to an embodiment of the present disclosure.

FIG. 19 is a schematic diagram of another data processing apparatus according to an embodiment of the present disclosure. As shown in FIG. 19, the data processing apparatus may include: a first obtaining unit 10, a first processing unit 20, a second processing unit 30 and a third processing unit 40. The first processing unit 20 includes: a tagging module 21 and a processing module 22. The processing module 22 includes: an extraction submodule 221 and an assembly submodule 222.

It should be noted that, the first obtaining unit 10, the first processing unit 20, the second processing unit 30, the third processing unit 40, the tagging module 21, and the processing module 22 in one embodiment play the same role as those in the data processing apparatus in the embodiment shown in FIG. 17.

The extraction submodule 221 is configured to extract, by using a preset state function, different state information of execution of a current event object of the game client from the tagged sample data, the current event object being an event object currently executed by the game client.

The assembly submodule 222 is configured to assemble the different state information, to obtain the plurality of layers of data combinations.

It should be noted herein that, the extraction submodule 221 and the assembly submodule 222 may be used as a part of the apparatus and run in a terminal. A processor in the terminal may be used for performing functions implemented by the foregoing modules. The terminal may be a terminal device such as a smartphone (for example, an Android mobile phone or an iOS mobile phone), a tablet computer, a palmtop computer, an MID, or a PAD.

Figure 20:
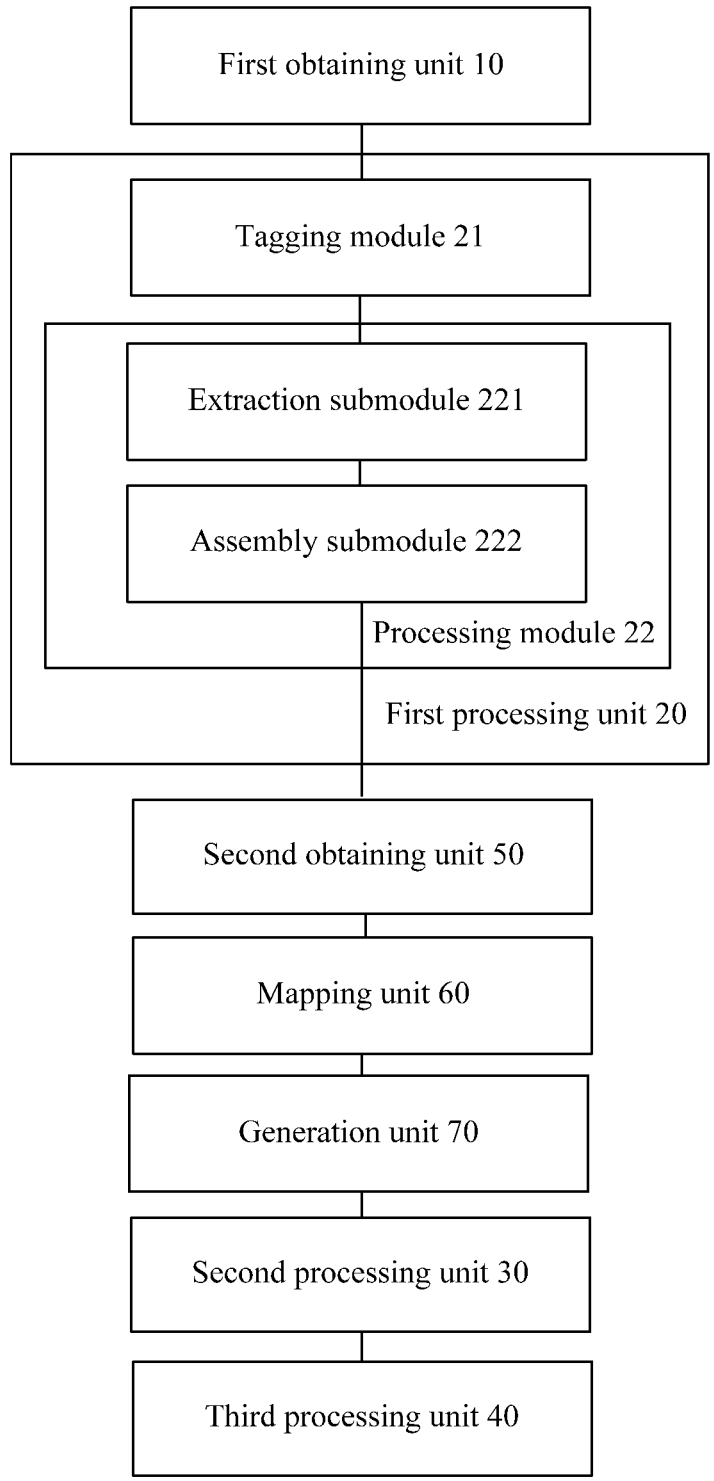
FIG. 20 is a schematic diagram of another data processing apparatus according to an embodiment of the present disclosure.

FIG. 20 is a schematic diagram of another data processing apparatus according to an embodiment of the present disclosure. As shown in FIG. 20, the data processing apparatus may include: a first obtaining unit 10, a first processing unit 20, a second processing unit 30 and a third processing unit 40. The first processing unit 20 includes: a tagging module 21 and a processing module 22. The processing module 22 includes: an extraction submodule 221 and an assembly submodule 222. The data processing apparatus further includes: a second obtaining unit 50, a mapping unit 60 and a generation unit 70.

It should be noted that, the first obtaining unit 10, the first processing unit 20, the second processing unit 30, the third processing unit 40, the extraction submodule 221 and the assembly submodule 222 in one embodiment play the same role as those in the data processing apparatus in the embodiment shown in FIG. 19, and details are not described herein again.

The second obtaining unit 50 is configured to: before the performing processing on the sample information on each layer of data combination according to the processing algorithm corresponding to each layer of the plurality of layers of data combinations, to obtain the processing result of each layer of data combination, obtain character data on the game client.

The mapping unit 60 is configured to map the state information and the character data to a preset processing model according to a preset mapping system, to obtain event data of the target event.

The generation unit 70 is configured to generate the sample information according to the state information, the character data and the event data.

It should be noted herein that, the second obtaining unit 50, the mapping unit 60, and the generation unit 70 may be used as a part of the apparatus and run in a terminal. A processor in the terminal may be used for performing functions implemented by the foregoing modules. The terminal may be a terminal device such as a smartphone (for example, an Android mobile phone or an iOS mobile phone), a tablet computer, a palmtop computer, an MID, or a PAD.

Figure 21:
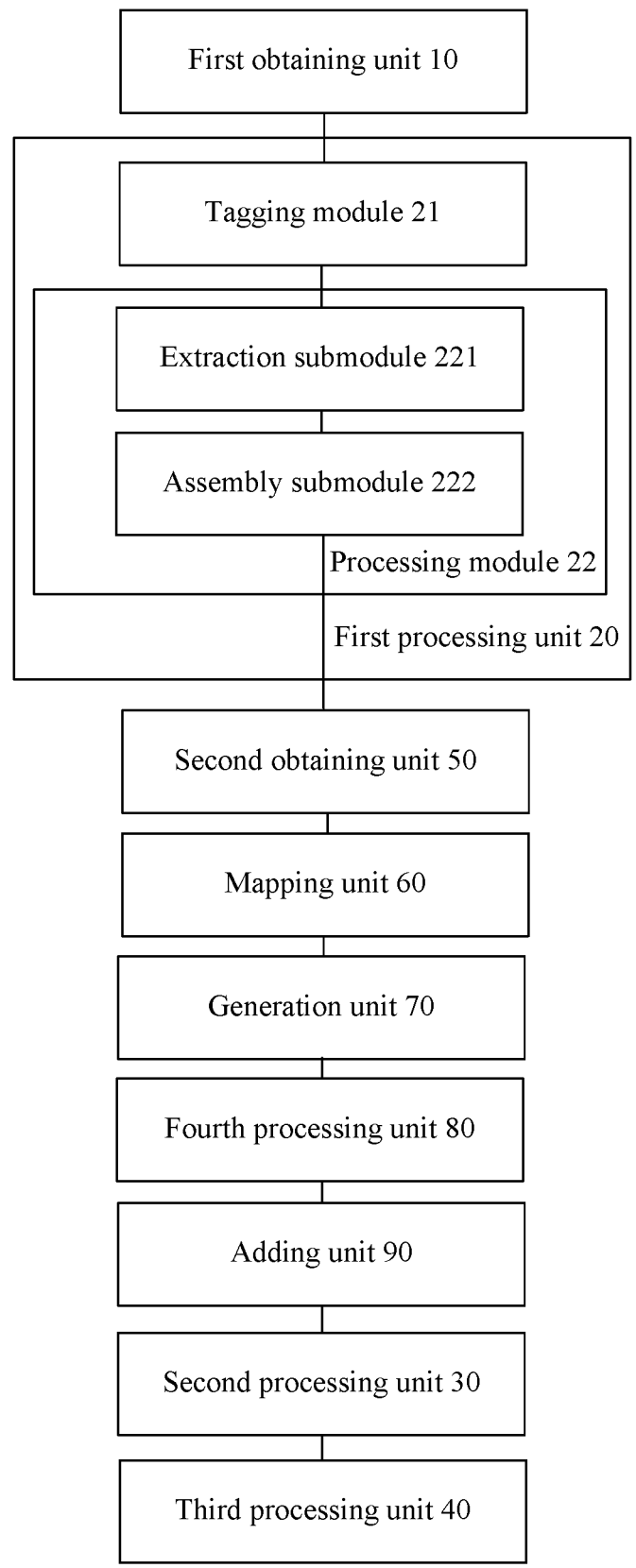
FIG. 21 is a schematic diagram of another data processing apparatus according to an embodiment of the present disclosure.

FIG. 21 is a schematic diagram of another data processing apparatus according to an embodiment of the present disclosure. As shown in FIG. 21, the data processing apparatus may include: a first obtaining unit 10, a first processing unit 20, a second processing unit 30, a third processing unit 40, a second obtaining unit 50, a mapping unit 60 and a generation unit 70. The first processing unit 20 includes: a tagging module 21 and a processing module 22. The processing module 22 includes: an extraction submodule 221 and an assembly submodule 222. The data processing apparatus further includes: a fourth processing unit 80 and an adding unit 90.

It should be noted that, the first obtaining unit 10, the first processing unit 20, the second processing unit 30, the third processing unit 40, the second obtaining unit 50, the mapping unit 60 and the generation unit 70, the tagging module 21 and the processing module 22, and the extraction submodule 221 and the assembly submodule 222 in one embodiment play the same role as those in the data processing apparatus in the embodiment shown in FIG. 20, and details are not described herein again.

The fourth processing unit 80 is configured to: after the generating the sample information according to the state information, the character data and the event data, perform rotation processing on the sample data, to extend the sample quantity corresponding to the sample data.

The adding unit 90 is configured to add preset information to sample information of the extended sample data.

It should be noted herein that, the fourth processing unit 80 and the adding unit 90 may be used as a part of the apparatus and run in a terminal. A processor in the terminal may be used for performing functions implemented by the foregoing modules. The terminal may be a terminal device such as a smartphone (for example, an Android mobile phone or an iOS mobile phone), a tablet computer, a palmtop computer, an MID, or a PAD.

Figure 22:
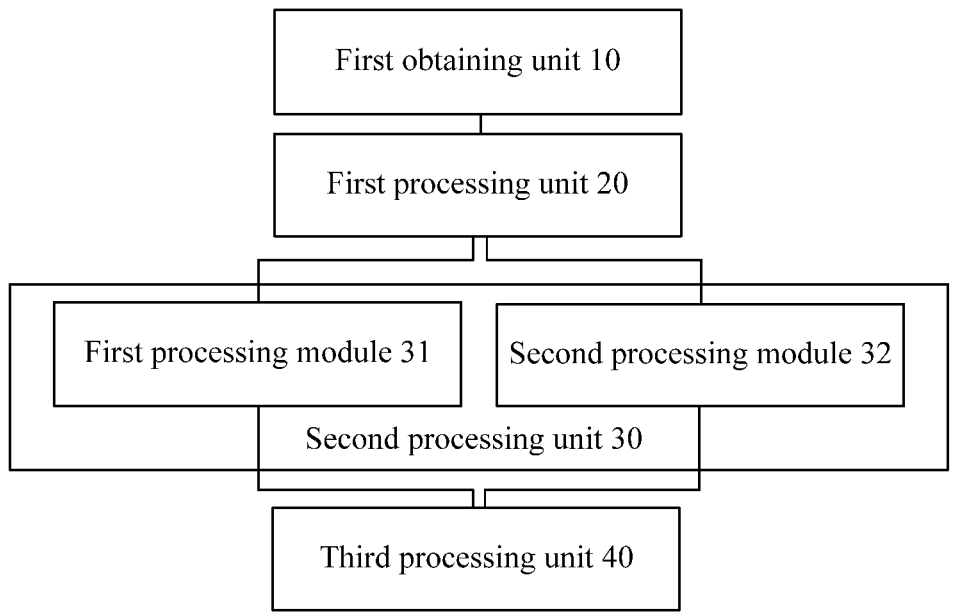
FIG. 22 is a schematic diagram of another data processing apparatus according to an embodiment of the present disclosure.

FIG. 22 is a schematic diagram of another data processing apparatus according to an embodiment of the present disclosure. As shown in FIG. 22, the data processing apparatus may include: a first obtaining unit 10, a first processing unit 20, a second processing unit 30 and a third processing unit 40. The second processing unit 30 includes: a first processing module 31 and a second processing module 32.

It should be noted that, the first obtaining unit 10, the first processing unit 20, the second processing unit 30 and the third processing unit 40 in one embodiment play the same role as those in the data processing apparatus in the embodiment shown in FIG. 16, and details are not described herein again.

The first processing module 31 is configured to perform processing on the sample information on each layer of data combination according to a preset probability model corresponding to each layer of data combination, to obtain an execution probability that is of execution of the target event of the game client and that corresponds to each layer of data combination.

The second processing module 32 is configured to perform processing on the sample information on each layer of data combination according to a preset value model corresponding to each layer of data combination, to obtain an execution value that is of execution of the target event of the game client and that corresponds to each layer of data combination.

The third processing unit 40 is configured to perform consolidation processing on the execution probability corresponding to each layer of data combination and the execution value corresponding to each layer of data combination, to obtain the target instruction.

It should be noted herein that, the first processing module 31 and the second processing module 32 may be used as a part of the apparatus and run in a terminal. A processor in the terminal may be used for performing functions implemented by the foregoing modules.

The terminal may be a terminal device such as a smartphone (for example, an Android mobile phone or an iOS mobile phone), a tablet computer, a palmtop computer, an MID, or a PAD.

Figure 23:
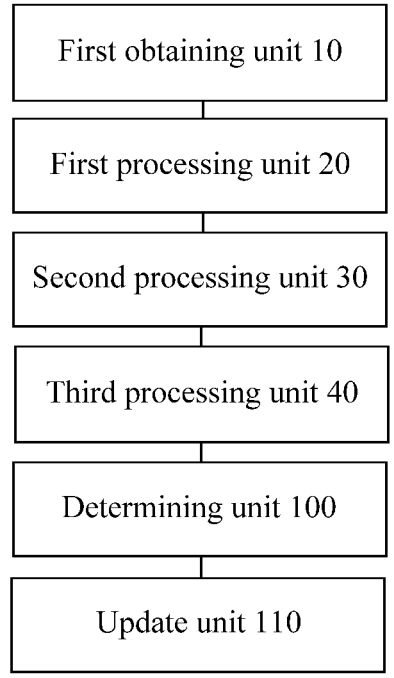
FIG. 23 is a schematic diagram of another data processing apparatus according to an embodiment of the present disclosure.

FIG. 23 is a schematic diagram of another data processing apparatus according to an embodiment of the present disclosure. As shown in FIG. 23, the data processing apparatus may include: a first obtaining unit 10, a first processing unit 20, a second processing unit 30 and a third processing unit 40. The data processing apparatus further includes: a determining unit 100 and an update unit 110.

It should be noted that, the first obtaining unit 10, the first processing unit 20, the second processing unit 30 and the third processing unit 40 in one embodiment play the same role as those in the data processing apparatus in the embodiment shown in FIG. 16, and details are not described herein again.

The determining unit 100 is configured to: after the obtaining a processing result of each layer of data combination and performing consolidation processing on the processing result of each layer of data combination to obtain a target instruction, determine, according to a preset state evaluation function, whether the target instruction needs to be updated.

The update unit 110 is configured to update the target instruction when it is determined that the target instruction needs to be updated.

It should be noted herein that, the determining unit 100 and the update unit 110 may be used as a part of the apparatus and run in a terminal. A processor in the terminal may be used for performing functions implemented by the foregoing modules. The terminal may be a terminal device such as a smartphone (for example, an Android mobile phone or an iOS mobile phone), a tablet computer, a palmtop computer, an MID, or a PAD.

According to one embodiment of the present disclosure, the first obtaining unit 10 obtains sample data of event execution of a game client; the first processing unit 20 preprocesses the sample data to obtain a plurality of layers of data combinations, each layer of the plurality of layers of data combinations corresponding to a target event object in a same target event, different layers of the plurality of layers of data combinations corresponding to different target event objects in the target event, and the target event objects being event objects on the game client to be executed concurrently; the second processing unit 30 processes each layer of data combination according to a preset processing algorithm, to obtain a processing result of each layer of data combination; and the third processing unit 40 performs consolidation processing on the processing result of each layer of data combination to obtain a target instruction, the target instruction being used for instructing the game client to concurrently execute the different target event objects corresponding to the different layers of data combinations. In this way, a technical problem of a low data processing efficiency in the related art is resolved, and a technical effect of improving data processing efficiency is achieved.

It should be noted herein that, examples and application scenarios of the foregoing units and modules are the same as those implemented in the corresponding steps, but are not limited to the content disclosed in the foregoing embodiments. It should be noted that, the modules as a part of the apparatus may run in the hardware environment shown in FIG. 3, and may be implemented by software, or may be implemented by hardware. The hardware environment includes a network environment.

The functional modules provided in the embodiments in this application may run in a mobile terminal, a computer terminal or a similar operation apparatus, or may be used as a part of a storage medium for storage.

An embodiment of the present disclosure may provide a terminal. The terminal may be any computer terminal device in a computer terminal group. Optionally, in one embodiment, the terminal may be replaced by a terminal device such as a mobile terminal.

Optionally, in one embodiment, the foregoing terminal may be located in at least one of a plurality of network devices in a computer network.

According to an embodiment of the present disclosure, a terminal for performing the foregoing data processing method is further provided. The terminal may be a computer terminal. The computer terminal may be any computer terminal device in a computer terminal group. Optionally, in one embodiment, the computer terminal may be replaced by a terminal device such as a mobile terminal.

Optionally, in one embodiment, the foregoing computer terminal may be located in at least one of a plurality of network devices in a computer network.

Figure 24:
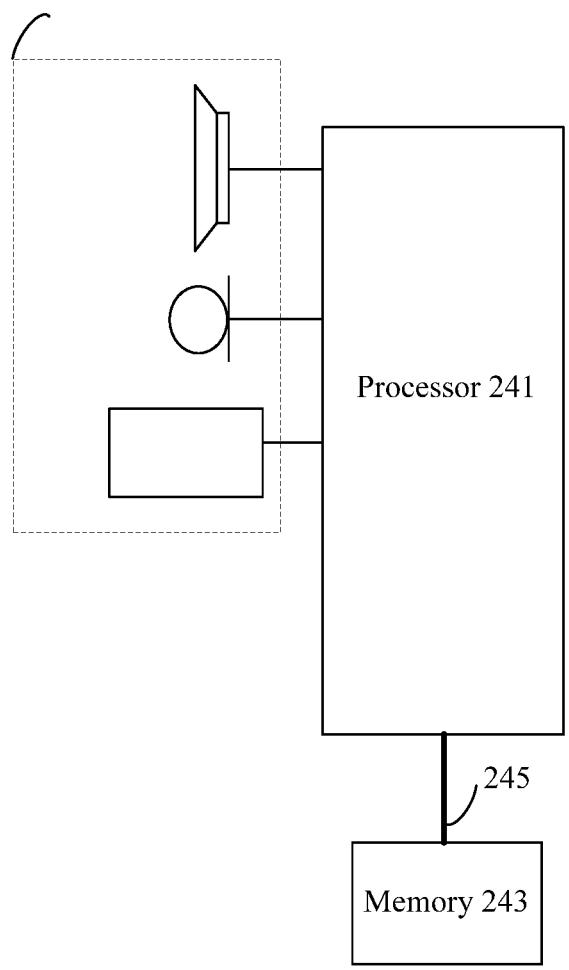
FIG. 24 is a structural block diagram of a terminal according to an embodiment of the present disclosure.

FIG. 24 is a structural block diagram of a terminal according to an embodiment of the present disclosure. As shown in FIG. 24, the terminal may include: one or more (only one is shown in the figure) processors 241, a memory 243, and a transmission apparatus 245. As shown in FIG. 24, the terminal may further include an input output device 247.

The memory 243 may be configured to store a software program and module, for example, program instructions/modules corresponding to the data processing method and apparatus in the embodiments of the present disclosure. The processor 241 runs the software program and module stored in the memory 243 to implement various function application and data processing, that is, implement the foregoing data processing method. The memory 243 may include a high-speed random memory, and may further include a non-volatile memory such as one or more magnetic storage apparatuses, a flash, or another non-volatile solid-state memory. In some examples, the memory 243 may further include memories remotely disposed relative to the processor 241, and the remote memories may be connected to the terminal by using a network. Examples of the network include but are not limited to the Internet, an intranet, a local area network, a mobile communications network, and a combination thereof.

The foregoing transmission apparatus 245 is configured to receive or send data by using a network, and may further be configured to perform processing on data transmission between the processor and the memory. Specific examples of the foregoing network may include a wired network and a wireless network. In an example, the transmission apparatus 245 includes a network adapter (network interface controller, NIC). The network adapter may be connected to another network device and a router by using a network cable, so as to perform communication with the Internet or a local network. In an example, the transmission apparatus 245 is a radio frequency (RF) module, and is configured to communicate with the Internet in a wireless manner.

Specifically, the memory 243 is configured to store an application program.

The processor 241 may invoke, by using the transmission apparatus 245, the application program stored in the memory 243, to execute program code of steps of a method of each optional or preferred embodiment in the foregoing method embodiments, including: obtaining sample data of event execution of a game client; performing preprocessing on the sample data to obtain a plurality of layers of data combinations, each layer of the plurality of layers of data combinations corresponding to a target event object in a same target event, different layers of the plurality of layers of data combinations corresponding to different target event objects in the target event, and the target event objects being event objects on the game client to be executed concurrently; processing sample information on each layer of data combination according to a preset processing algorithm, to obtain a processing result of each layer of data combination; and performing consolidation processing on the processing result of each layer of data combination to obtain a target instruction, the target instruction being used for instructing the game client to concurrently execute the different target event objects corresponding to the different layers of data combinations.

The processor 241 is further configured to perform the followings: tagging the sample data according to a plurality of sample sequences of the sample data, to obtain tagged sample data; performing preprocessing on the tagged sample data to obtain the plurality of layers of data combinations, different layers of the plurality of layers of data combinations corresponding to different processing algorithms and different sample information; and performing processing on the sample information on each layer of data combination according to the processing algorithm corresponding to each layer of the plurality of layers of data combinations, to obtain the processing result of each layer of data combination.

The processor 241 is further configured to perform the followings: determining a priority of each of the plurality of sample sequences; sequentially tagging each sample sequence according to the priority by using a tagging frame, to obtain a plurality of tagged sample sequences; combining neighboring tagged sample sequences of the plurality of tagged sample sequences according to a same tagging frame, to obtain a combined tagged sample sequence; and tagging a start frame and an end frame of the combined tagged sample sequence, to obtain the tagged sample data.

The processor 241 is further configured to perform the followings: extracting, by using a preset state function, different state information of execution of a current event object of the game client from the tagged sample data, the current event object being an event object currently executed by the game client; and assembling the different state information, to obtain the plurality of layers of data combinations.

The processor 241 is further configured to perform the followings: before the performing processing on the sample information on each layer of data combination according to the processing algorithm corresponding to each layer of the plurality of layers of data combinations, to obtain the processing result of each layer of data combination, obtaining character data on the game client; mapping the state information and the character data to a preset processing model according to a preset mapping system, to obtain event data of the target event; and generating the sample information according to the state information, the character data and the event data.

The processor 241 is further configured to perform the followings: after the generating the sample information according to the state information, the character data and the event data, performing rotation processing on the sample data, to extend the sample quantity corresponding to the sample data; and adding preset information to sample information of the extended sample data.

The processor 241 is further configured to perform the followings: performing processing on the sample information on each layer of data combination according to a preset probability model corresponding to each layer of data combination, to obtain an execution probability that is of execution of the target event of the game client and that corresponds to each layer of data combination; and performing processing on the sample information on each layer of data combination according to a preset value model corresponding to each layer of data combination, to obtain an execution value that is of execution of the target event of the game client and that corresponds to each layer of data combination, the obtaining a processing result of each layer of data combination and performing consolidation processing on the processing result of each layer of data combination to obtain a target instruction including: performing consolidation processing on the execution probability corresponding to each layer of data combination and the execution value corresponding to each layer of data combination, to obtain the target instruction.

The processor 241 is further configured to perform the followings: after the obtaining a processing result of each layer of data combination and performing consolidation processing on the processing result of each layer of data combination to obtain a target instruction, determining, according to a preset state evaluation function, whether the target instruction needs to be updated; and updating the target instruction if it is determined that the target instruction needs to be updated.

The processor 241 is further configured to perform the followings: after the obtaining a processing result of each layer of data combination and performing consolidation processing on the processing result of each layer of data combination to obtain a target instruction, obtaining different target state information during execution of the different target event objects according to the target instruction by the game client; and updating the processing result of each layer of data combination according to the different target state information, to obtain an updated processing result of each layer of data combination, the obtaining a processing result of each layer of data combination and performing consolidation processing on the processing result of each layer of data combination to obtain a target instruction including: obtaining the updated processing result of each layer of data combination, and performing consolidation processing on the updated processing results of the plurality of layers of data combinations, to obtain an updated target instruction.

According to one embodiment of the present disclosure, a solution of a data processing method is provided. Sample data of event execution of a game client is obtained; the sample data is tagged according to a plurality of sample sequences of the sample data, to obtain tagged sample data; preprocessing is performed on the tagged sample data to obtain a plurality of layers of data combinations, each layer of the plurality of layers of data combinations corresponding to a target event object in a same target event, different layers of the plurality of layers of data combinations corresponding to different target event objects in the target event, the target event objects being event objects on the game client to be executed concurrently, and different layers of data combinations corresponding to different processing algorithms and different sample information; processing is performed on the sample information on each layer of data combination according to the processing algorithm corresponding to each layer of the plurality of layers of data combinations, to obtain a processing result of each layer of data combination; and the processing result of each layer of data combination is obtained and consolidation processing is performed on the processing result of each layer of data combination to obtain a target instruction, the target instruction being used for instructing the game client to concurrently execute the different target event objects corresponding to the different layers of data combinations. In this way, an objective of obtaining a target instruction by performing consolidation processing on the processing result of each layer of the plurality of layers of data combinations is achieved, and a technical effect of improving data processing efficiency is achieved, thereby resolving a technical problem of a low data processing efficiency in the related art. For a specific example, refer to the examples described in the foregoing embodiments.

Persons of ordinary skill in the art may understand that the structure shown in FIG. 24 is only exemplary. The terminal may be a terminal device such as a smartphone (for example, an Android mobile phone or an iOS mobile phone), a tablet computer, a palmtop computer, an MID, or a PAD. FIG. 24 does not limit the structure of the foregoing electronic device. For example, the terminal may include more or fewer components (such as a network interface or a display apparatus) than that are shown in FIG. 24, or may have a configuration different from that shown in FIG. 24.

Persons of ordinary skill in the art may understand that all or some of the steps of the methods in the foregoing embodiments may be implemented by a program instructing relevant hardware. The program may be stored in a computer-readable storage medium, and the storage medium may be a flash memory, a ROM, a RAM, a magnetic disk, an optical disc, or the like.

An embodiment of the present disclosure further provides a non-transitory storage medium. Optionally, in one embodiment, the foregoing storage medium may store program code, the program code being used for performing steps of the data processing method provided in the foregoing method embodiments.

Optionally, in one embodiment, the foregoing storage medium may be located in any computer terminal in a computer terminal group in a computer network, or located in any mobile terminal in a mobile terminal group.

Optionally, in one embodiment, the storage medium is configured to store program code for performing the followings: obtaining sample data of event execution of a game client; performing preprocessing on the sample data to obtain a plurality of layers of data combinations, each layer of the plurality of layers of data combinations corresponding to a target event object in a same target event, different layers of the plurality of layers of data combinations corresponding to different target event objects in the target event, and the target event objects being event objects on the game client to be executed concurrently; processing sample information on each layer of data combination according to a preset processing algorithm, to obtain a processing result of each layer of data combination; and performing consolidation processing on the processing result of each layer of data combination to obtain a target instruction, the target instruction being used for instructing the game client to concurrently execute the different target event objects corresponding to the different layers of data combinations.

Optionally, the storage medium is further configured to store program code for performing the followings. tagging the sample data according to a plurality of sample sequences of the sample data, to obtain tagged sample data; performing preprocessing on the tagged sample data to obtain the plurality of layers of data combinations, different layers of the plurality of layers of data combinations corresponding to different processing algorithms and different sample information; and performing processing on the sample information on each layer of data combination according to the processing algorithm corresponding to each layer of the plurality of layers of data combinations, to obtain the processing result of each layer of data combination.

Optionally, the storage medium is further configured to store program code for performing the followings. determining a priority of each of the plurality of sample sequences; sequentially tagging each sample sequence according to the priority by using a tagging frame, to obtain a plurality of tagged sample sequences; combining neighboring tagged sample sequences of the plurality of tagged sample sequences according to a same tagging frame, to obtain a combined tagged sample sequence; and tagging a start frame and an end frame of the combined tagged sample sequence, to obtain the tagged sample data.

Optionally, the storage medium is further configured to store program code for performing the followings. extracting, by using a preset state function, different state information of execution of a current event object of the game client from the tagged sample data, the current event object being an event object currently executed by the game client; and assembling the different state information, to obtain the plurality of layers of data combinations.

Optionally, the storage medium is further configured to store program code for performing the followings. before the performing processing on the sample information on each layer of data combination according to the processing algorithm corresponding to each layer of the plurality of layers of data combinations, to obtain the processing result of each layer of data combination, obtaining character data on the game client; mapping the state information and the character data to a preset processing model according to a preset mapping system, to obtain event data of the target event; and generating the sample information according to the state information, the character data and the event data.

Optionally, the storage medium is further configured to store program code for performing the followings. after the generating the sample information according to the state information, the character data and the event data, performing rotation processing on the sample data, to extend the sample quantity corresponding to the sample data; and adding preset information to sample information of the extended sample data.

Optionally, the storage medium is further configured to store program code for performing the followings. performing processing on the sample information on each layer of data combination according to a preset probability model corresponding to each layer of data combination, to obtain an execution probability that is of execution of the target event of the game client and that corresponds to each layer of data combination; and performing processing on the sample information on each layer of data combination according to a preset value model corresponding to each layer of data combination, to obtain an execution value that is of execution of the target event of the game client and that corresponds to each layer of data combination, the obtaining a processing result of each layer of data combination and performing consolidation processing on the processing result of each layer of data combination to obtain a target instruction including: performing consolidation processing on the execution probability corresponding to each layer of data combination and the execution value corresponding to each layer of data combination, to obtain the target instruction.

Optionally, the storage medium is further configured to store program code for performing the followings. after the obtaining a processing result of each layer of data combination and performing consolidation processing on the processing result of each layer of data combination to obtain a target instruction, determining, according to a preset state evaluation function, whether the target instruction needs to be updated; and updating the target instruction if it is determined that the target instruction needs to be updated.

Optionally, the storage medium is further configured to store program code for performing the followings. after the obtaining a processing result of each layer of data combination and performing consolidation processing on the processing result of each layer of data combination to obtain a target instruction, obtaining different target state information during execution of the different target event objects according to the target instruction by the game client; and updating the processing result of each layer of data combination according to the different target state information, to obtain an updated processing result of each layer of data combination, the obtaining a processing result of each layer of data combination and performing consolidation processing on the processing result of each layer of data combination to obtain a target instruction including: obtaining the updated processing result of each layer of data combination, and performing consolidation processing on the updated processing results of the plurality of layers of data combinations, to obtain an updated target instruction.

Optionally, for a specific example in one embodiment, refer to the examples described in the foregoing embodiments. This is not described in one embodiment again.

Optionally, in one embodiment, the storage medium may include any medium that may store program code such as a USB flash drive, a ROM, a RAM, a removable hard disk, a magnetic disk, or an optical disc.

The update method of the data processing method, the apparatus, and the storage medium according to of the present disclosure are described above with reference to the accompanying drawings by way of example. However, persons skilled in the art should understand that they may make various modifications to the update method, the apparatus, and the storage medium of the virtual application attributes provided in the present disclosure without departing from the content of the present disclosure. Therefore, the protection scope of the present disclosure shall be subject to the appended claims.

When being implemented in the form of a software functional unit and sold or used as an independent product, the integrated unit in the foregoing embodiments may be stored in the foregoing computer-readable storage medium. The computer software product is stored in a storage medium and includes several instructions for instructing one or more computer devices (which may be a personal computer, a server, a network device, or the like) to perform all or some of the steps of the methods in the embodiments of the present disclosure.

In the foregoing embodiments of the present disclosure, the description of each embodiment has respective focuses, and for the part that is not detailed in an embodiment, refer to the relevant description of other embodiments.

In the several embodiments provided in this application, it should be understood that the disclosed client may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objective of the solutions in the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software functional unit.

The foregoing descriptions are merely exemplary implementations of the present disclosure. It should be noted that persons of ordinary skill in the art may make several improvements or polishing without departing from the principle of the present disclosure and the improvements or polishing shall fall within the protection scope of the present disclosure.

INDUSTRIAL PRACTICABILITY

In the embodiments of the present disclosure, sample data of event execution of a game client is obtained; preprocessing is performed on the sample data to obtain a plurality of layers of data combinations, each layer of the plurality of layers of data combinations corresponding to a target event object in a same target event, different layers of the plurality of layers of data combinations corresponding to different target event objects in the target event, and the target event objects being event objects on the game client to be executed concurrently; processing is performed on each layer of data combination according to a preset processing algorithm, to obtain a processing result of each layer of data combination; and consolidation processing is performed on the processing result of each layer of data combination to obtain a target instruction. In this way, an objective of obtaining a target instruction by performing consolidation processing on the processing result of each layer of the plurality of layers of data combinations is achieved, and a technical effect of improving data processing efficiency is achieved, thereby resolving a technical problem of a low data processing efficiency in the related art.

What is claimed is:

1. A data processing method, applied in a real-time electronic game, comprising:

receiving, by a policy selection server from a terminal, sample data of event execution of a game client running on the terminal;

generating, by the policy selection server, a first and a second decision layers of data combinations according to the sample data, wherein the first and the second layers of data combination respectively correspond to a first and a second characters in a target event, wherein the first and the second characters are different from each other and are each an own-side character, a friendly-side character, or an adversary-side character, and wherein the first and the second characters are event objects;

generating, by the policy selection server, a third decision layer of data combinations corresponding to a third character, wherein the first character includes the own-side character corresponding to the first decision layer of data combinations, wherein the second character includes the friendly-side character corresponding to the second decision layer of data combinations, wherein the third character includes the adversary-side character corresponding to the third decision layer of data combinations, and wherein the first, the second, and third decision layers of data combinations are generated concurrently;

processing, by the policy selection server, each of the first, the third, and the second decision layers of data combinations, according to a preset processing algorithm, to obtain event data and character data respectively on the first and the second characters, wherein the preset processing algorithm includes a first preset probability model to process the first decision layer of data combinations and a second preset probability model to process the second decision layer of data combinations, and wherein the first preset probability model differs than the second preset probability model;

performing, by the policy selection server, consolidation processing on the character data and the event data to obtain a target instruction, wherein the target instruction is used for executing operations of the first and the second characters respectively corresponding to the first and the second layers of data combinations; and sending, by the policy selection server, the target instruction to the terminal for execution.

2. The method according to claim 1, further comprising: tagging, by the policy selection server, a plurality of sample sequences of the sample data to obtain tagged sample data.

3. The method according to claim 1, further comprising:
obtaining, by the policy selection server, an execution probability of execution of the target event of the game client according to the first preset probability model or the second preset probability model; and
obtaining, by the policy selection server, an execution value of execution of the target event of the game client; and
performing, by the policy selection server, consolidation processing on the execution probability and the execution value to obtain the target instruction.

4. The method according to claim 1, further comprising:
receiving, by the policy selection server, a feedback from the terminal;
updating, by the policy selection server, the target instruction according to the feedback to obtain an updated target instruction; and
sending, by the policy selection server, the updated target instruction to the terminal for execution.

5. The method according to claim 1, further comprising:
obtaining, by the policy selection server, updated state information;
generating, by the policy selection server, an update on the first and the second decision layers of data combinations according to the updated state information;
obtaining, by the policy selection server, an updated target instruction according to the update on the first and the second decision layers of data combinations; and
sending, by the policy selection server, the updated target instruction to the terminal for execution.

6. The method according to claim 1, wherein the second decision layer of data combinations includes two or more sub-layers, and where the friendly-side character includes two or more persons, each corresponding to the two or more sub-layers.

7. The method according to claim 1, wherein the first, the second, and the third decision layers are generated by:
grouping, by the policy selection server, a first portion of the data combinations corresponding to the first character into the first decision layer;
grouping, by the policy selection server, a second portion of the data combinations corresponding to the second character into the second decision layer;
grouping, by the policy selection server, a third portion of the data combinations corresponding to the third character into the third decision layer; and
executing, by the policy selection server, the first, the second, and the third characters concurrently by concurrently accessing data from the first, the second, and the third decision layers respectfully.

8. The method according to claim 7, wherein the first, the second, and the third decision layers are generated further by:
tagging, by the policy selection server, the first portion of the data combinations corresponding to the first character prior to grouping the first portion of the data combinations into the first decision layer;
tagging, by the policy selection server, the second portion of the data combinations corresponding to the second character prior to grouping the second portion of the data combinations into the second decision layer; and
tagging, by the policy selection server, the third portion of the data combinations corresponding to the third character prior to grouping the third portion of the data combinations into the third decision layer.

9. The method according to claim 1, further comprising:
receiving, by the policy selection server, state information of the sample data from the terminal; processing, by the policy selection server, the sample data for each piece of the sample data to be of a form <S, u, a>, wherein S represents the state information, u represents the character data, and a represents the event data; feeding, by the policy selection server, the each piece of the sample data in the form of <S, u, a> to the consolidation processing to obtain the target instruction; and processing, by the policy selection server, each of the first, the third, and the second decision layers of data combinations, according to a preset processing algorithm, to obtain event data and character data respectively on the first and the second characters.

10. A data processing system, comprising: a memory storing computer program instructions; and one or more processors coupled to the memory and, upon executing the computer program instructions, configured to perform:
receiving, from a terminal, sample data of event execution of a game client running on the terminal;
generating a first and a second decision layers of data combinations according to the sample data, wherein the first and the second decision layers of data combination respectively correspond to a first and a second characters in a target event, wherein the first and the second characters are different from each other and are each an own-side character, a friendly-side character, or an adversary-side character, and wherein the first and the second characters are event objects on the game client to be executed concurrently;
generating a third decision layer of data combinations corresponding to a third character, wherein the first character includes the own-side character corresponding to the first decision layer of data combinations, wherein the second character includes the friendly-side character corresponding to the second decision layer of data combinations, wherein the third character includes the adversary-side character corresponding to the third decision layer of data combinations, and wherein the first, the second, and third decision layers of data combinations are generated concurrently;
processing each of the first, the third, and the second decision layers of data combinations, according to a preset processing algorithm, to obtain event data and character data respectively on the first and the second characters, wherein the preset processing algorithm includes a first preset probability model to process the first decision layer of data combinations and a second preset probability model to process the second decision layer of data combinations, and wherein the first preset probability model differs than the second preset probability model;
performing consolidation processing on the character data and the event data to obtain a target instruction, wherein the target instruction is used for instructing the game client to concurrently execute the first and the second characters respectively corresponding to the first and the second layers of data combinations; and
sending the target instruction to the terminal for execution.

11. The data processing system according to claim 10, wherein the one or more processors are further configured to perform:

tagging a plurality of sample sequences of the sample data to obtain tagged sample data.

12. The data processing system according to claim 10, wherein the one or more processors are further configured to perform:

obtaining an execution probability of execution of the target event of the game client according to the first preset probability model or the second preset probability model;

obtaining an execution value of execution of the target event of the game client; and performing consolidation processing on the execution probability and the execution value to obtain the target instruction.

13. The data processing system according to claim 10, wherein the one or more processors are further configured to perform:

receiving a feedback from the terminal;

updating the target instruction according to the feedback to obtain an updated target instruction; and sending the updated target instruction to the terminal for execution.

14. The data processing system according to claim 10, wherein obtaining updated state information;

generating an update on the first and the second decision layers of data combinations according to the updated state information;

obtaining an updated target instruction according to the update on the first and the second decision layers of data combinations; and sending the updated target instruction to the terminal for execution.

15. A non-transitory computer-readable storage medium storing computer program instructions executable by at least one processor to perform:

receiving, from a terminal, sample data of event execution of a game client running on the terminal;

generating a first and a second decision layers of data combinations according to the sample data, wherein the first and the second decision layers of data combination respectively correspond to a first and a second character in a target event, wherein the first and the second characters are different from each other and are each an own-side character, a friendly-side character, or an adversary-side character, and wherein the first and the second characters are event objects on the game client to be executed concurrently;

generating a third decision layer of data combinations corresponding to a third character, wherein the first character includes the own-side character corresponding to the first decision layer of data combinations, wherein the second character includes the friendly-side character corresponding to the second decision layer of data combinations, wherein the third character includes the adversary-side character corresponding to the third decision layer of data combinations, and wherein the first, the second, and third decision layers of data combinations are generated concurrently;

processing each of the first, the third, and the second decision layers of data combinations, according to a preset processing algorithm, to obtain event data and character data respectively on the first and the second characters, wherein the preset processing algorithm includes a first preset probability model to process the first decision layer of data combinations and a second preset probability model to process the second decision layer of data combinations, and wherein the first preset probability model differs than the second preset probability model;

performing consolidation processing on the character data, and the event data to obtain a target instruction, wherein the target instruction is used for instructing the game client to concurrently execute the first and the second characters respectively corresponding to the first and the second layers of data combinations; and sending the target instruction to the terminal for execution.

16. The non-transitory computer-readable storage medium according to claim 15, wherein the computer program instructions are executable by the at least one processor to further perform:

tagging a plurality of sample sequences of the sample data to obtain tagged sample data.

\* \* \* \* \*